Figure 1:
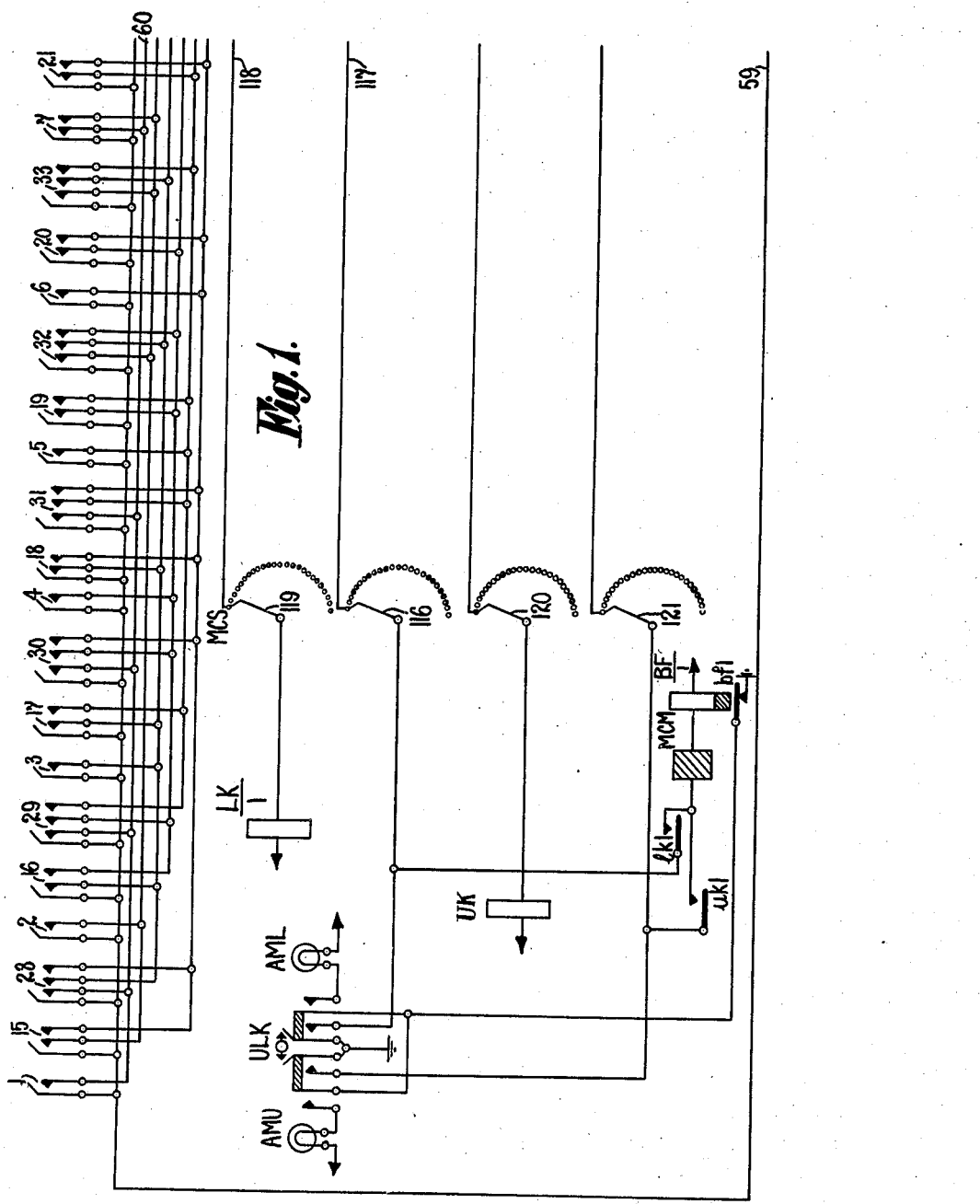

June 22, 1937.    L. M. SIMPSON    2,084,414
ELECTRIC TOTALIZATOR
Filed Sept. 29, 1930    18 Sheets-Sheet 2

Inventor
Lancelot Martin Simpson
Atty.

Patented June 22, 1937

2,084,414

UNITED STATES PATENT OFFICE 2,084,414

ELECTRIC TOTALIZATOR

Lancelot Martin Simpson, Stanks, near Leeds, England, assignor to Automatic Electric Company Limited, Liverpool, England, a British company Application September 29, 1930, Serial No. 485,181
In Great Britain October 15, 1929

8 Claims. (Cl. 235—92)

The present invention relates to electric totalizators of the fully automatic type, and may be considered as a development of the arrangements described in my copending United States application Serial No. 430,414 filed February 21, 1930. The object of the invention may be stated broadly to be the provisions of improved arrangements permitting ticket-issuing from a number of machines to take place at an extremely rapid rate so that the installation can readily be arranged to cater for very rapid ticket selling. The totalizator of the present invention is particularly adaptable for use wherever it is desired to totalize values of different denominations according to class such as at theatres, coliseums, race-courses, and the like, where rapid selling of different values of tickets of different descriptions or classes takes place. For purposes of illustration, the present invention is being described in connection with the totalizing of tickets sold in connection with horse-racing.

It will be recalled that in the prior arrangement the connections between the ticket-issuing machine and the central equipment was made over a group of signalling leads to a so-called decoding relay group associated with which was a constantly rotating switch, the wipers of which were connected in multiple with the switches associated with the other ticket-issuing machines, so that when a contact marked in accordance with a sale of a ticket on a particular runner was encountered, the necessary signal was transmitted to the totalizing machine associated with that runner. The wipers of the various switches, however, were given a special phase relationship so that no two switches would be in a position to register sales of tickets for the same runner at the same instant.

According to one feature of the invention, greater speed of working is attained in that in an electric totalizator employing rotating collecting switches for collecting indications from a plurality of transmitting stations, indications are collected simultaneously over different wipers of the same switch which may bear any desired phase relationship and hence will preferably be in alignment.

According to another feature of the invention, in an electric totalizator employing rotating collecting switches, each corresponding to a particular indication, for collecting indications from a plurality of transmitting stations, indications of different values are collected simultaneously over different wipers of the same collecting switch.

A further feature of the invention closely related to the features just mentioned is that in an electric totalizator having indications transmitted from a plurality of transmitting stations, indications of one character are stored on a relay group, the registration of a predetermined number of indications serving to effect a marking in the bank of a collecting switch corresponding to indications of higher denomination.

Figure 17:
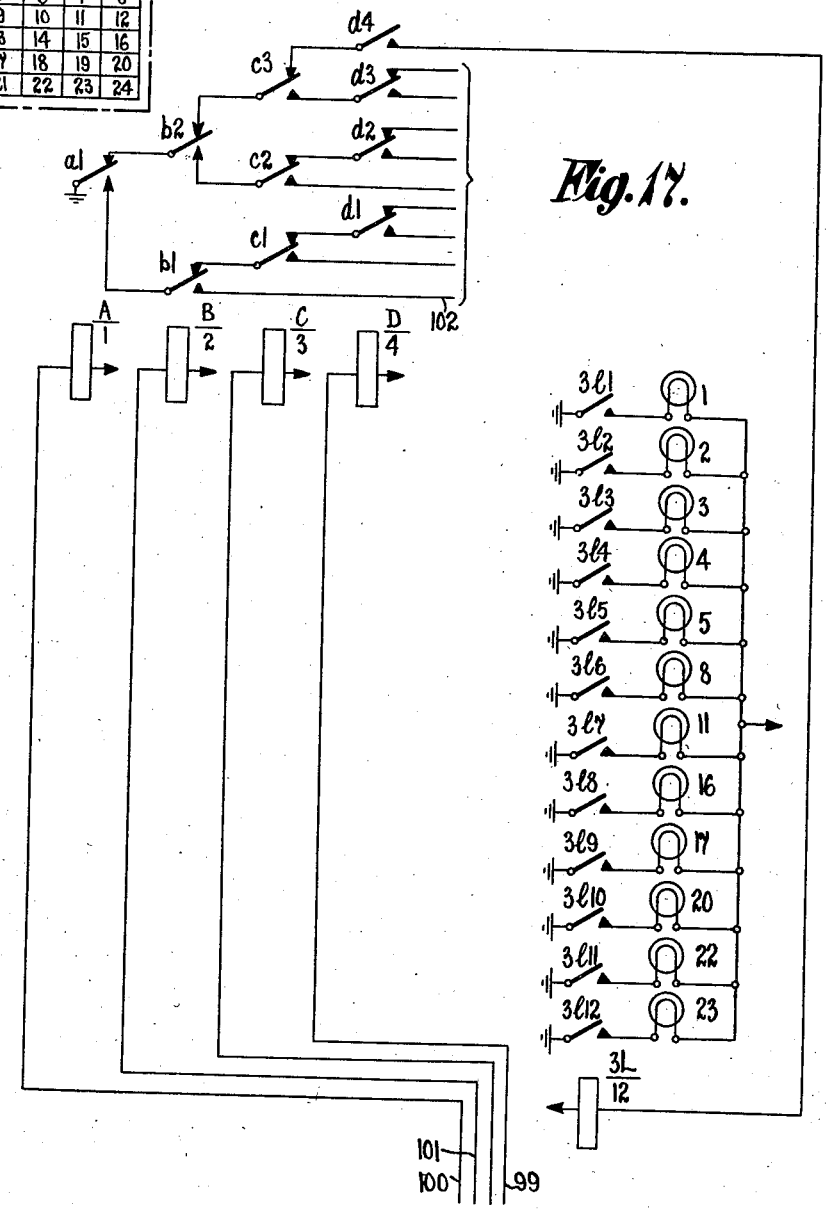
Figure 18:
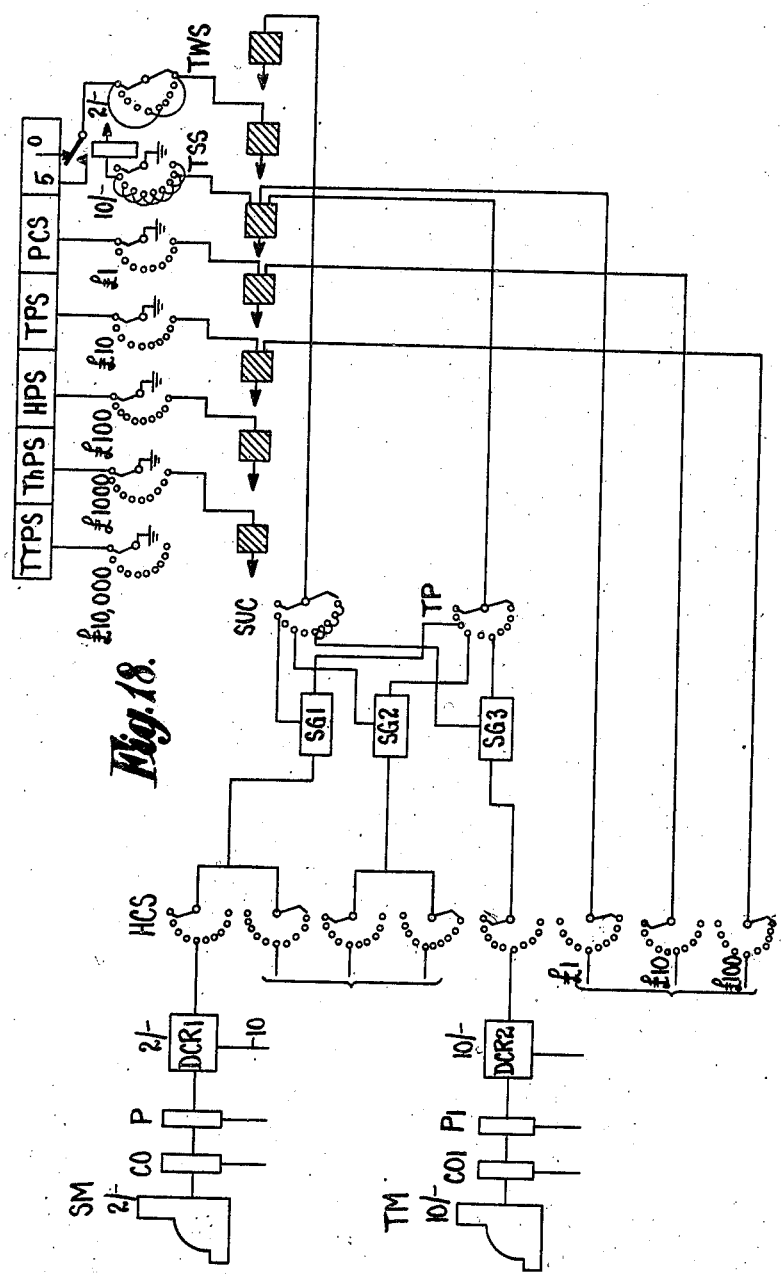

The invention will be better understood from the following description of one method of carrying it into effect which as a matter of convenience in description assumes its use in connection with horse racing. This description is given by way of example and should be taken in conjunction with the accompanying drawings of which Figs. 1–17, when fitted together in the manner indicated in Fig. 19, show the complete circuits of a totalizator installation, while Fig. 18 shows schematically the general layout.

A description will first be given of the general operation of the installation with reference to Fig. 18, which shows a trunking diagram of the apparatus involved in the collecting of markings corresponding to the sales of tickets on one particular horse from 200 ticket-issuing machines of different denominations, comprising 100 machines of 2/- denomination and 25 machines each of 10/-, £1, £10 and £100 denomination.

Assuming that the operator at the 2/- ticket-issuing machine SM receives a request for a 2/- ticket for a win on horse No. 1, he will operate the appropriate horse key on the ticket machine and will also move a common "win or place" key to the "win" position whereupon both keys are locked in their operated positions and a signal is transmitted in code to a decoding relay group designated DCRI in the main totalizing equipment. When this has been done, a marking is extended from the relay group DCRI to the appropriate bank contact of the horse collecting switch HCS, which is in continuous rotation in order to find such markings. The horse collecting switch HCS shown is assumed to be that for collecting sales of win tickets on horse No. 1 and is provided with eight banks and associated wipers over which sales markings may be collected from as many as 200 machines of different denominations since each bank comprises 25 contacts. When the topmost wiper of the switch HCS encounters the marking from the decoding relay group in question, a storing relay will be operated in the 2/- storing group designated SGI to register one unit, and at the same time a relay is operated in the decoding relay group DCRI. This causes a signal to be extended back over the leads to the ticket-issuing machine to initiate the ticket-issuing operation thereat, and when this is completed the keys which were locked in their operated positions are then automatically released. A similar marking is extended over conductor 10 to the appropriate bank contact of a switch similar to HCS associated with the "total win" totalizer, which also rotates to find this marking and operate an appropriate storing relay in a group similar to SG1 associated with the "total win" totalizer. In a similar manner, markings will be collected from other bank contacts of the switch HCS which are associated with other decoding relay groups similar to DCR1, and when 10 such units have been stored on the storing relays in the group SG1, a marking is extended to the banks of the translated £1 collecting switch TP, which thereupon rotates to find the marking and operate the driving magnet of the £1 counting switch PCS accordingly. During the transfer of the translated £1 to the £1 counting switch, the collecting operation of the horse collecting switch HCS is temporarily suspended, and does not recommence until the storing relays in the group SG1 have been released after the £1 marking has been duly recorded.

In similar manner ticket sales markings from the 10/- machine TM are registered on the 10/- decoding relay group DCR2 and from there will be collected over a different wiper of the switch HCS and stored on the 10/- storing relay group SG3. Each time two such units have been collected, a marking will be extended to the bank of the translated £1 collecting switch TP which thereupon rotates to find the marking and operate the driving magnet of the £1 counting switch PCS. In this case also the hunting motion of the collecting switch HCS is suspended until the storing relays in the group SG3 are released after the proper storing operation has been completed on the £1 counting switch PCS.

Markings are also extended from the £1, £10 and £100 decoding relay groups, but, as the traffic anticipated from these machines is not likely to be heavy, storing relay groups have been dispensed with and, in this case, the markings are extended direct to the associated counting switches PCS, TPS and HPS by way of the lower wipers of the switch HCS. It will be understood that, when the £1 counting switch PCS has made 10 steps, thereby registering the equivalent of 10 separate sales of £1 tickets, an impulse is extended to the driving magnet of the £10 counting switch TPS, and similarly when this switch has made 10 steps an impulse is extended to the driving magnet of the £100 counting switch HPS. It is likely, therefore, that at some period in the operation of the circuit, impulses will be extended to the counting switches from the direct source by way of the collecting switch HCS, and also from the indirect source by way of the translated £1 switch TP, or alternatively, the counting switch of the preceding digit. Hence, in order to prevent the two markings from becoming confused, means are provided whereby the marking from the direct source will always take precedence over that from the indirect source, and until both have been duly registered the operation of the horse collecting switch HCS is temporarily suspended.

When the end of the ticket-selling period is reached and the ticket-issuing machines are locked to prevent the issue of further tickets for the particular race, it is probable that various storing relays in the groups such as SG1 and SG3 will be in operated position, and the sales of tickets they represent will not have been registered on the main totalizing equipment, since as was previously explained it is necessary to store a definite number of such units before the translated £1 switch TP is brought into operation to transfer the marking on to the £1 counting switch PCS. Consequently, when the selling is stopped and the ticket machines are locked, the stored units collecting switch SUC is caused to rotate in order to collect up outstanding markings from each storing relay in the group in turn, and transfer them to the magnet of the 2/- counting switch TWS, so that the remainder of the ticket sales on this particular horse will be added to the display on both the horse and total indicators. It should also be mentioned that a 10/- counting switch TSS is provided and, in case the traffic from the 10/- machines was not unduly heavy, the storing group SG3 might be dispensed with and the markings could then be extended direct to the magnet of the 10/- counting switch. With the arrangement shown, however, indications from the 2/- counting switch TWS are passed by way of the 10/- counting switch TSS to the £1 counting switch PCS, and it will be noticed that the 10/- and 2/- counting switches are arranged to display on a single indicator, the alternate positions of the 10/- switch serving to operate a relay which advances the number displayed on the indicator by five units.

In case the ticket request had been for a place instead of for a win, the "win or place" key would have been operated to the place position, thereby effecting the operation of a switching relay P at the main totalizing equipment which would transfer all the signalling leads extending from the ticket-issuing machine to another decoding relay group on which markings could be extended to the appropriate bank contacts of another horse collecting switch similar to HCS associated with the place totalizing equipment. In a similar manner the place decoding relay group would extend a marking to the bank of a further collecting switch associated with the "total place" totalizer.

If it is desired to set up a ticket sale on a horse in the 41—80 group, a separate ticket issuing machine will be used which is connected in parallel with the 1—40 machine so that the same coding leads may be used in each case. The operation of the "win or place" key of this machine in either direction, however, completes the circuit of a relay designated CO in the main totalizing equipment to change over the code leads on to another decoding relay group capable of setting up markings on the banks of horse collecting switches 41—80.

Figure 2:
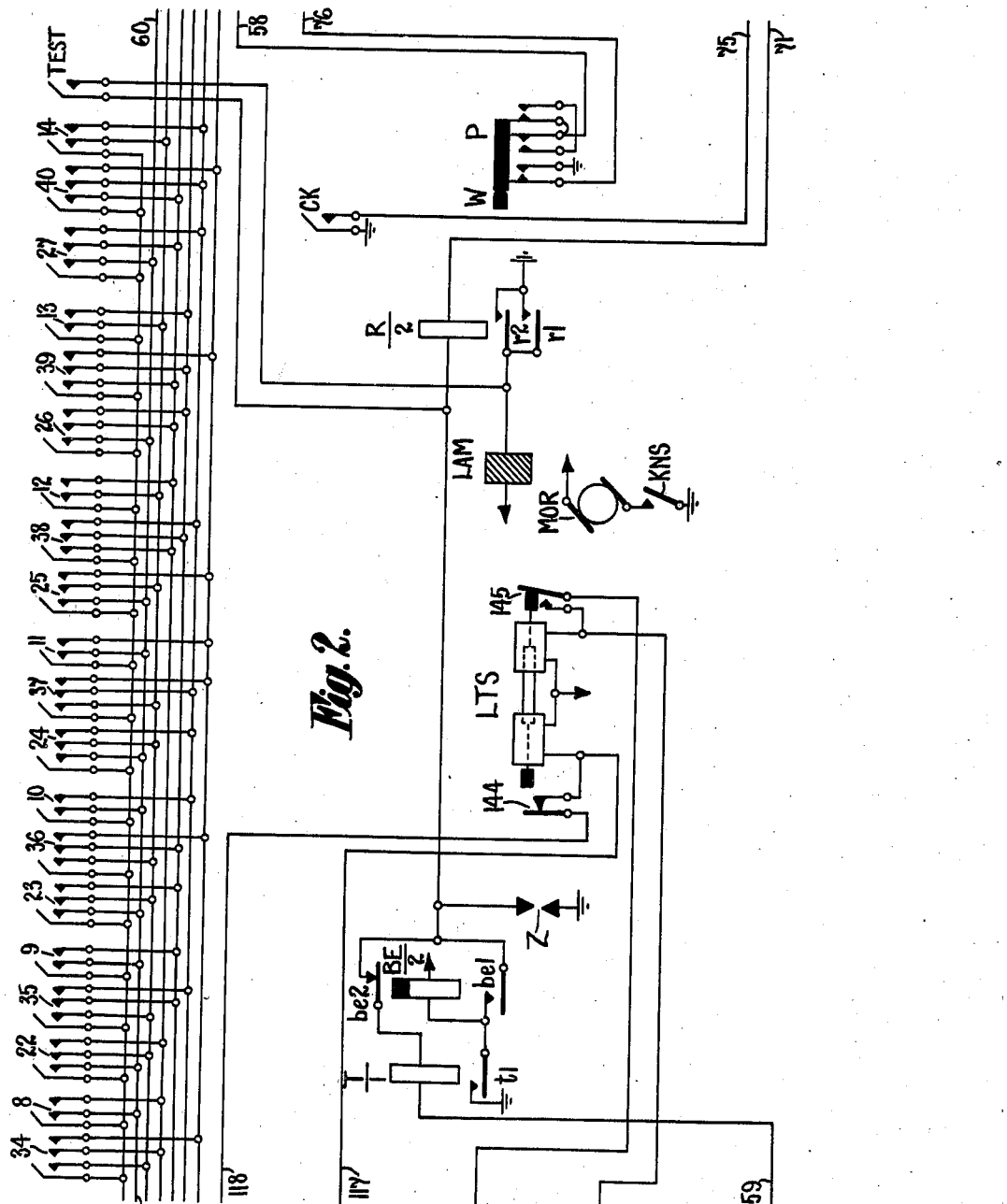
Figure 3:
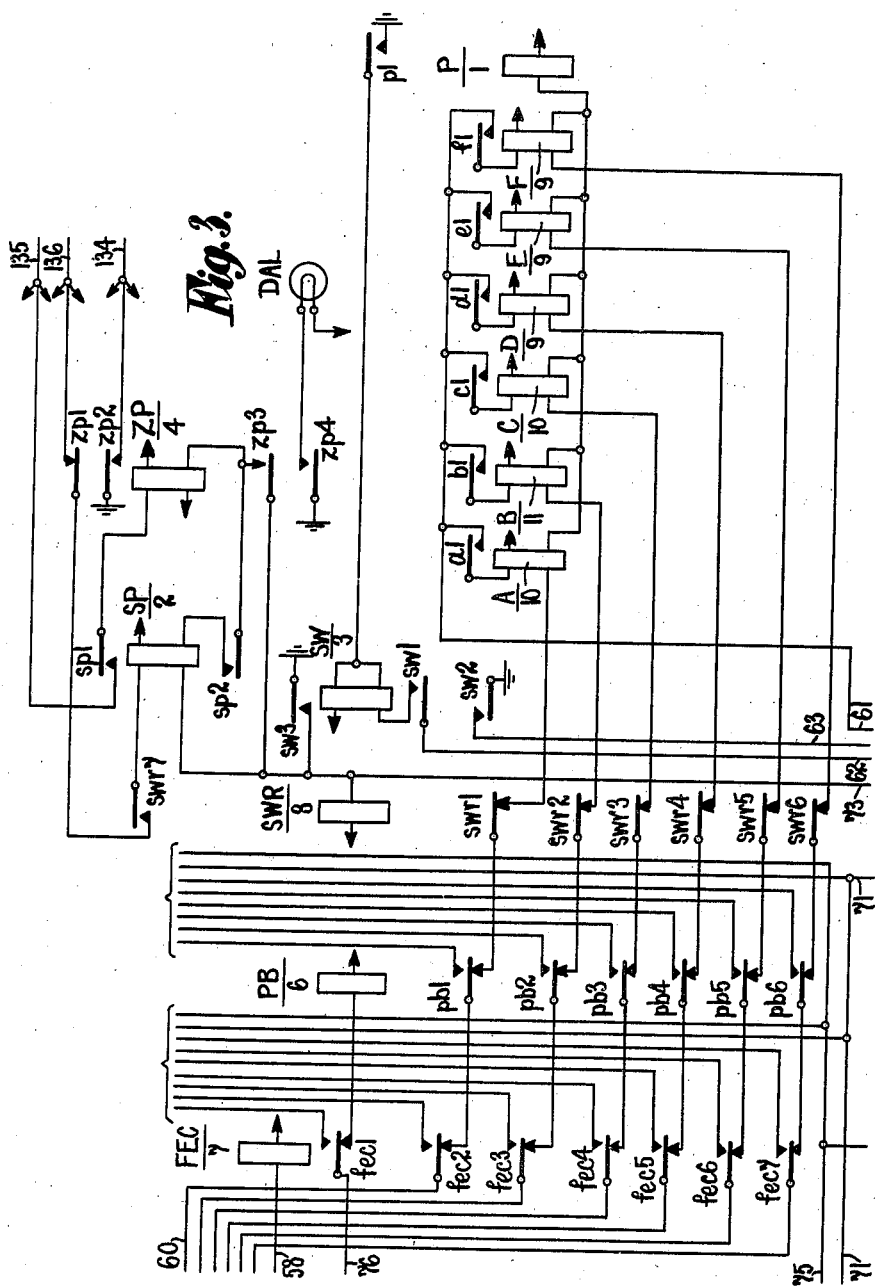
Figure 4:
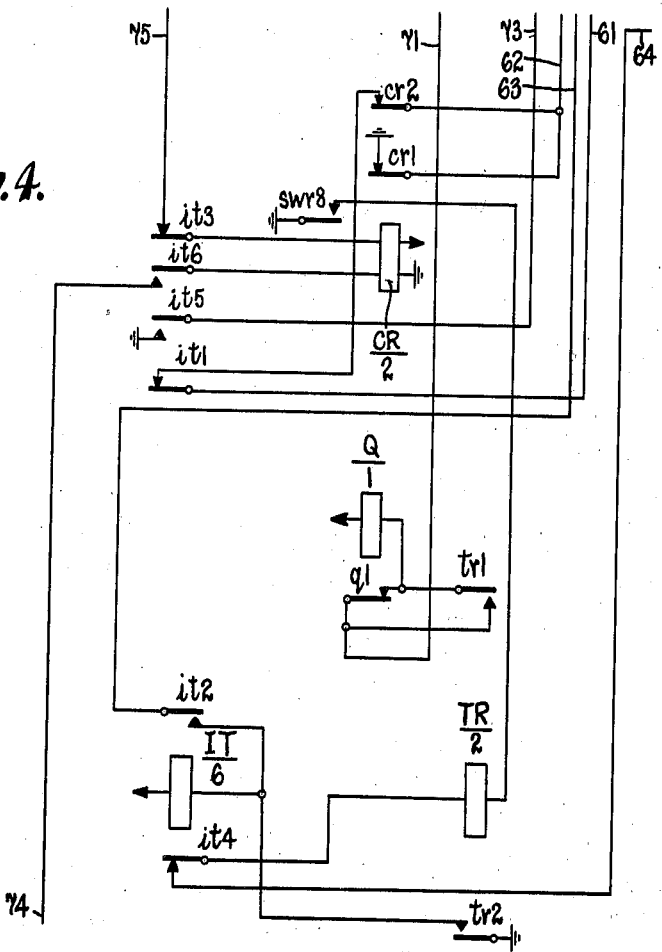
Figure 5:
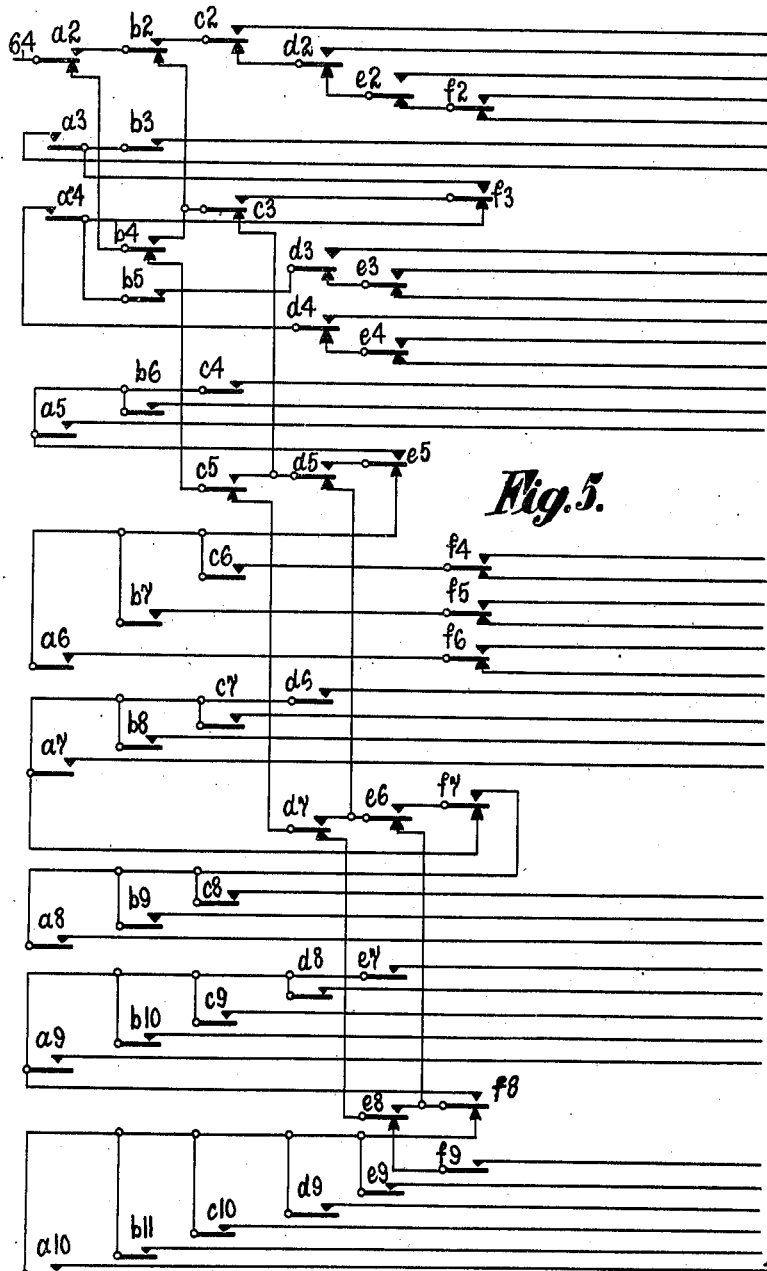
Figure 6:
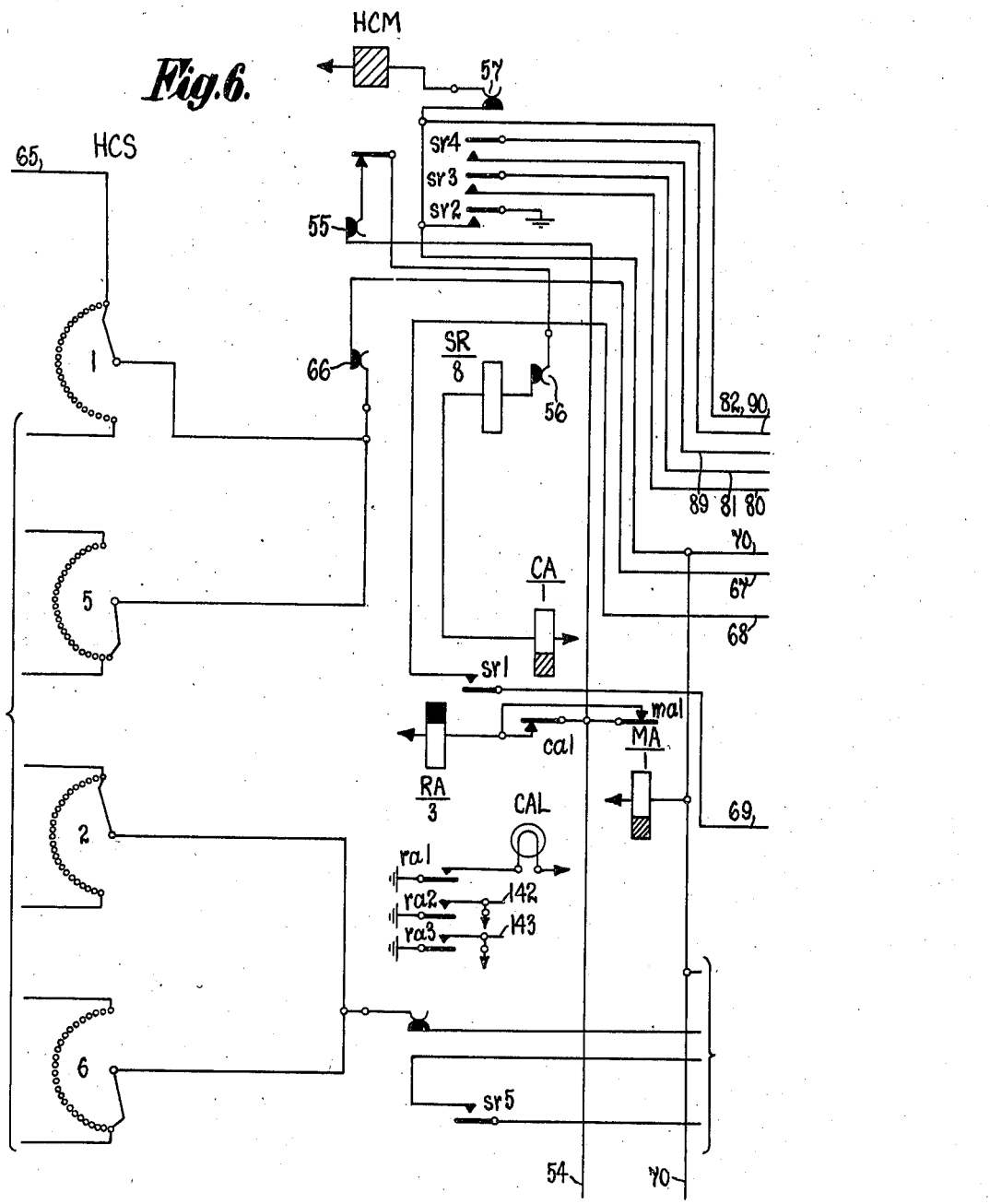
Figure 7:
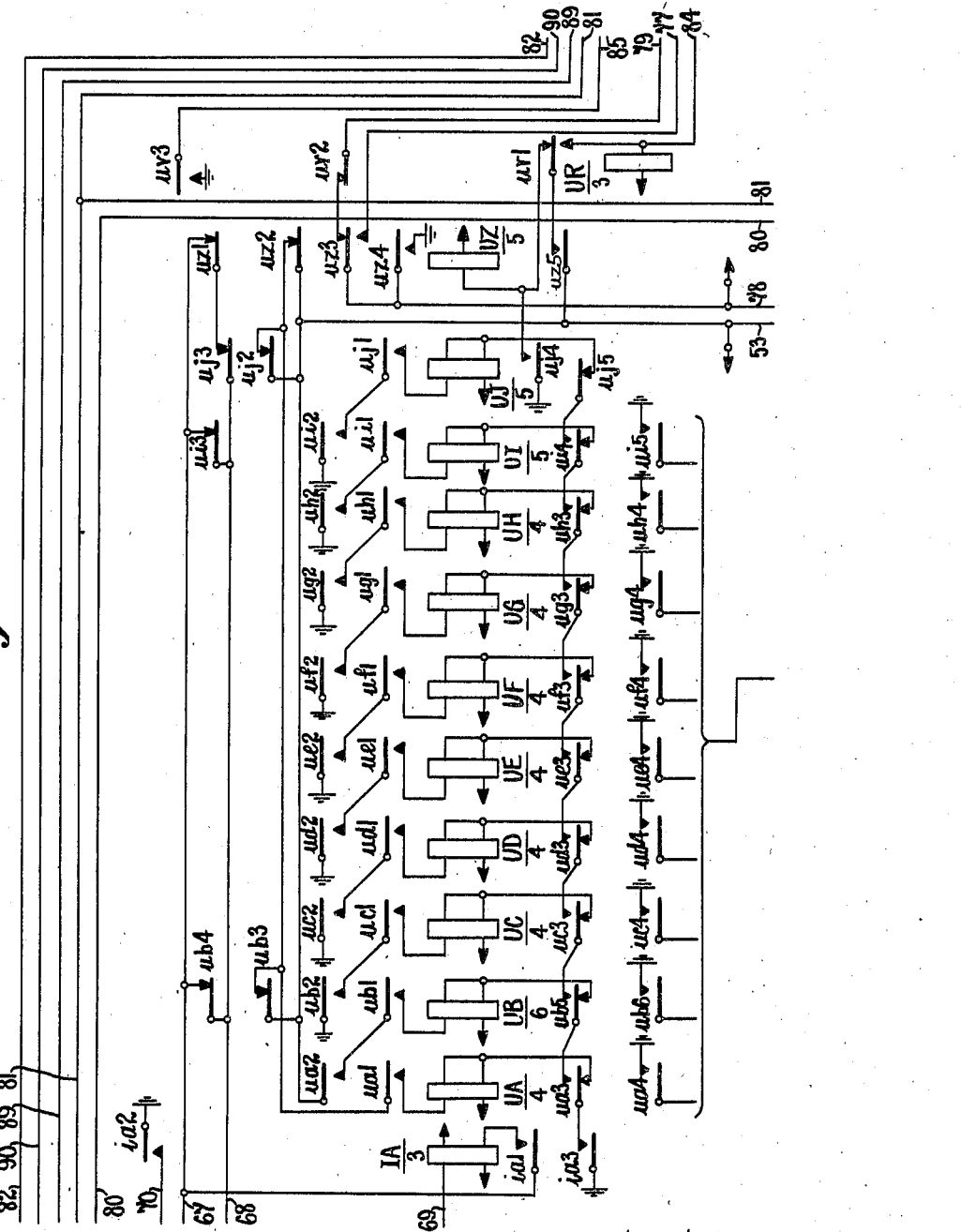
Figure 8:
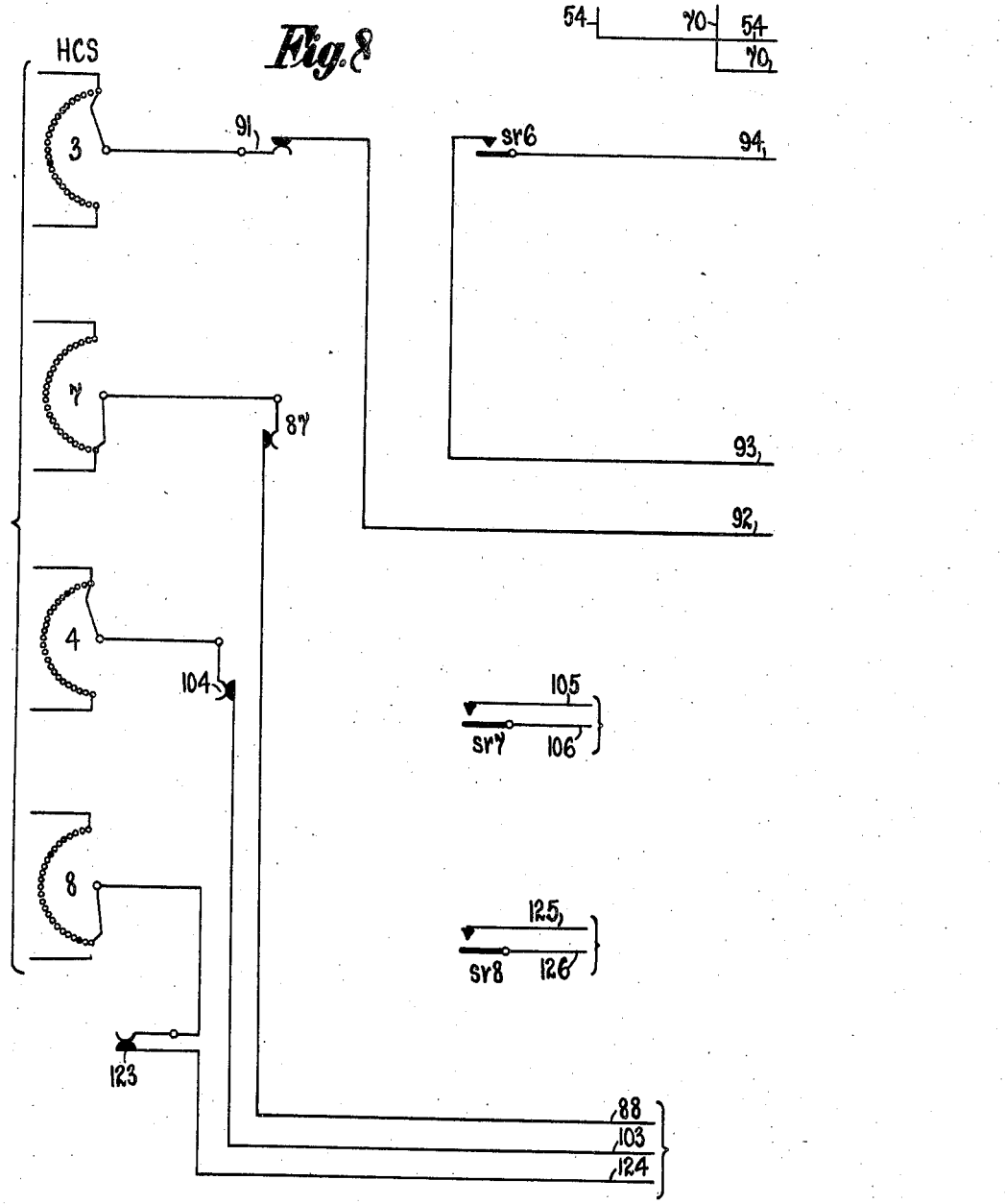
Figure 9:
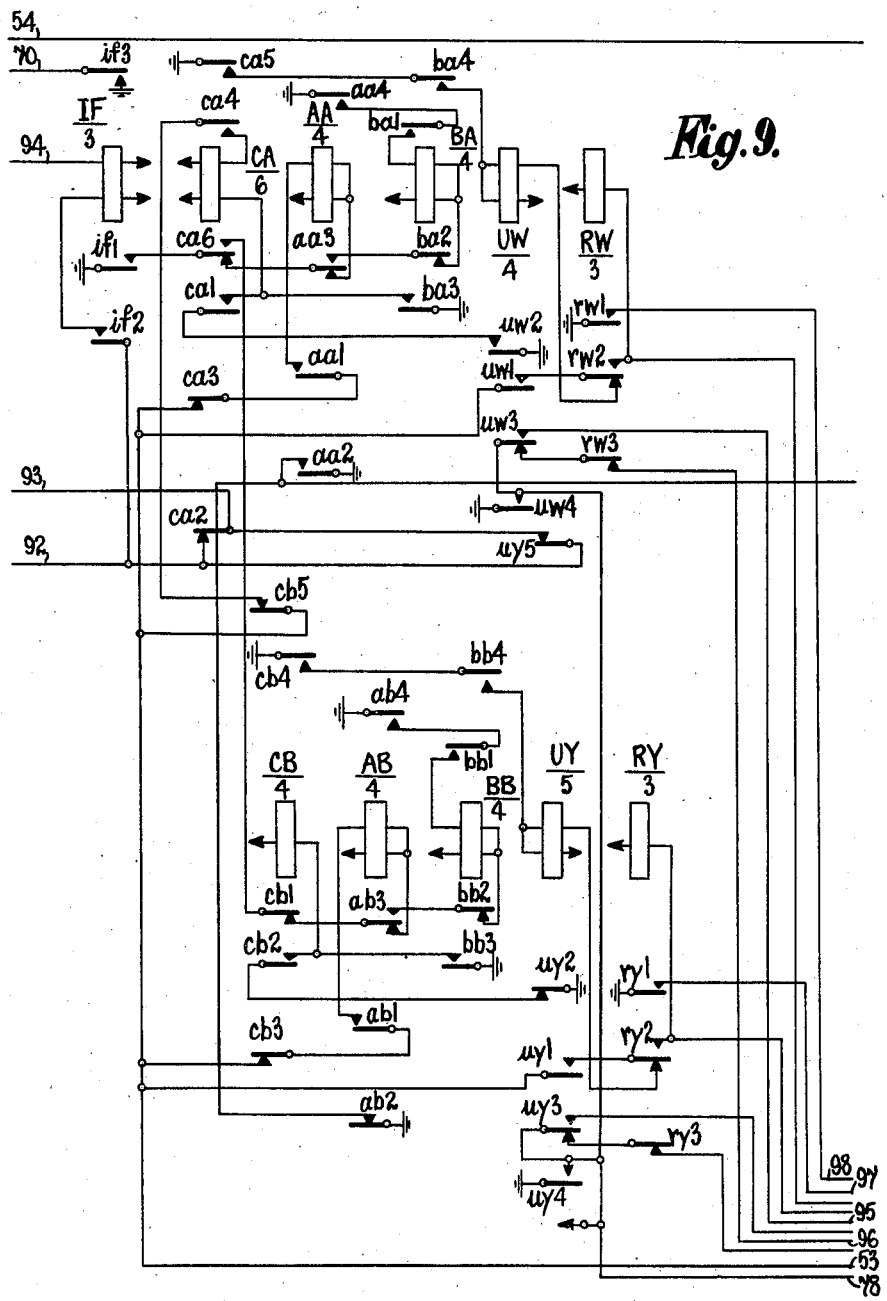
Figure 10:
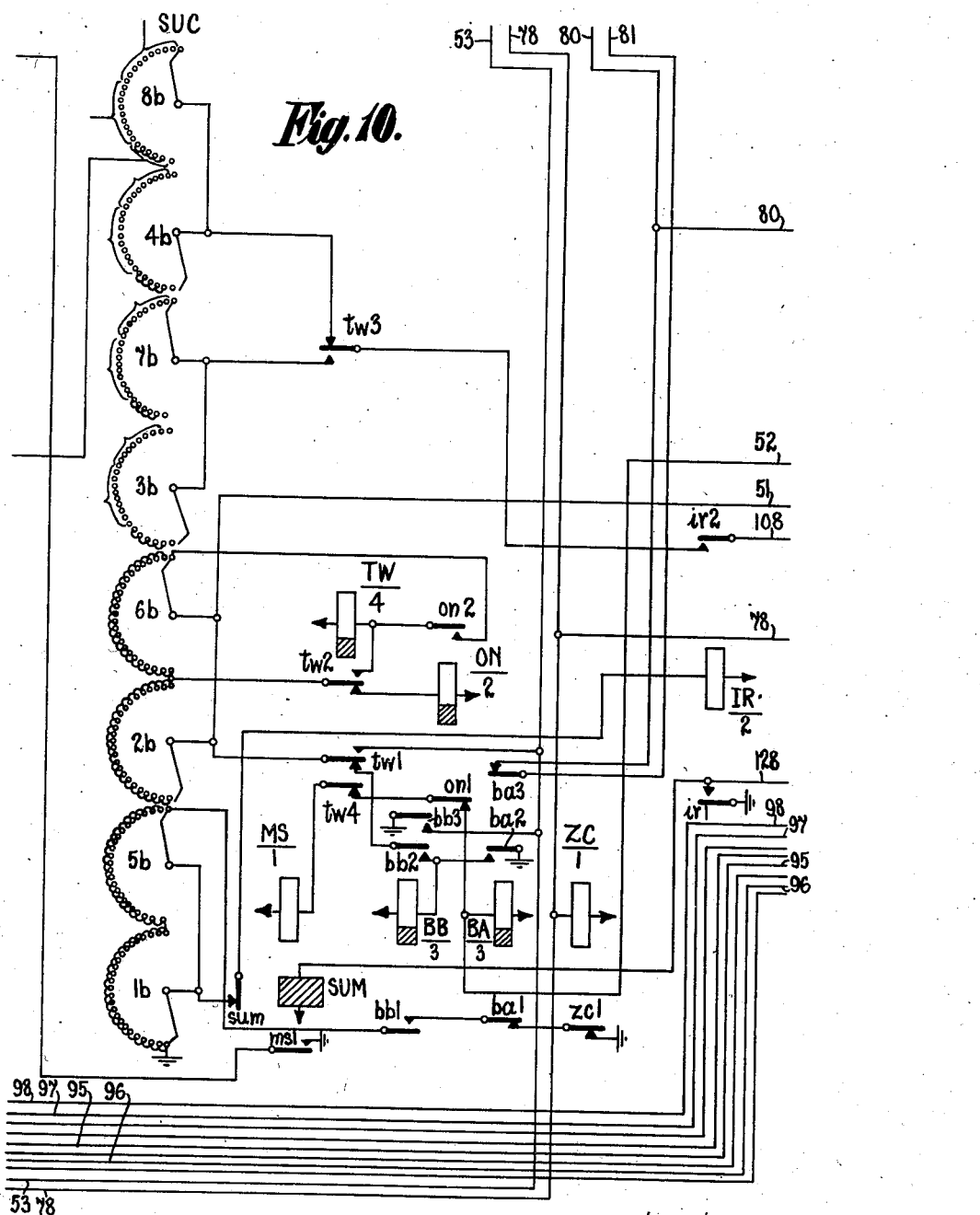
Figure 12:
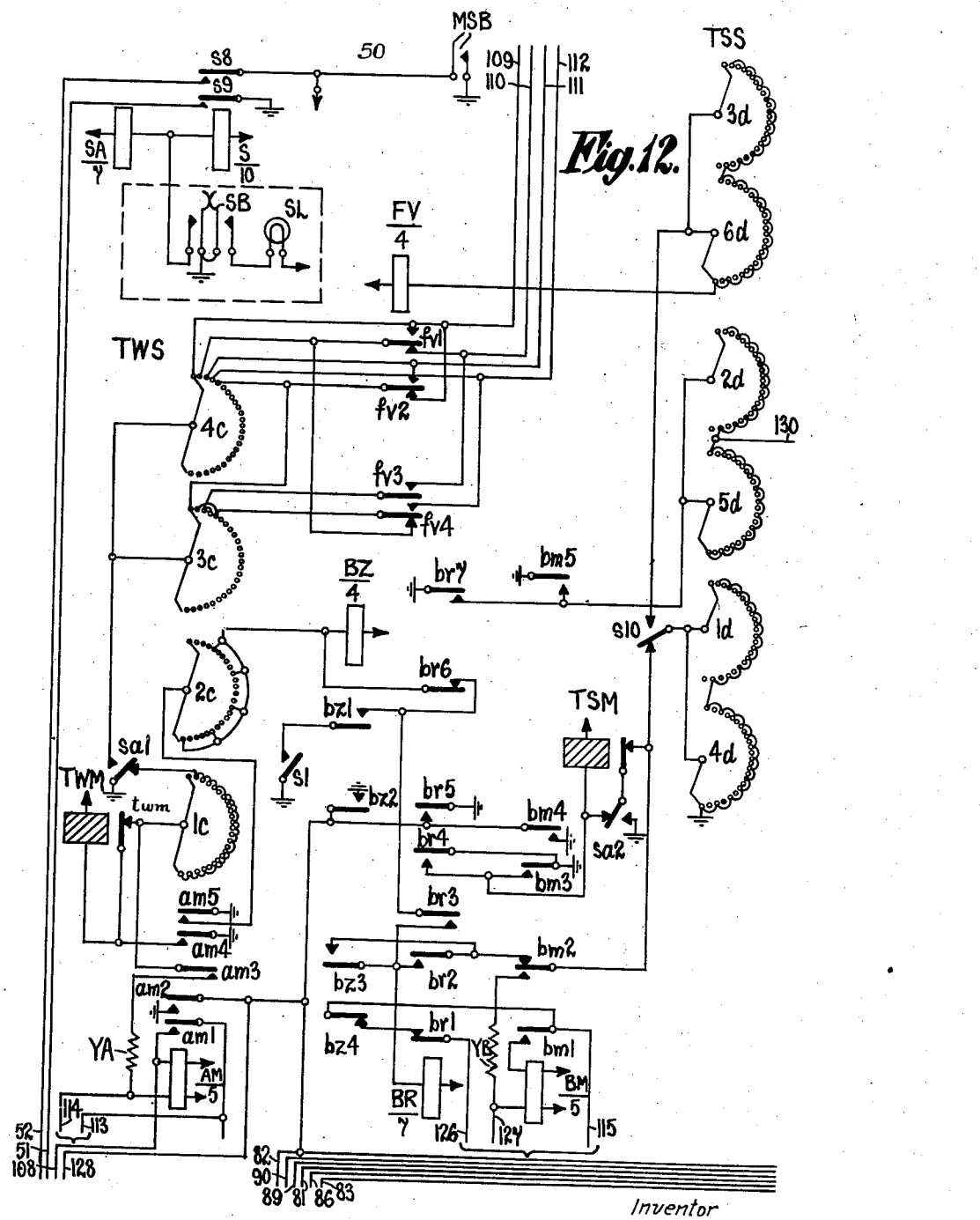
Figure 13:
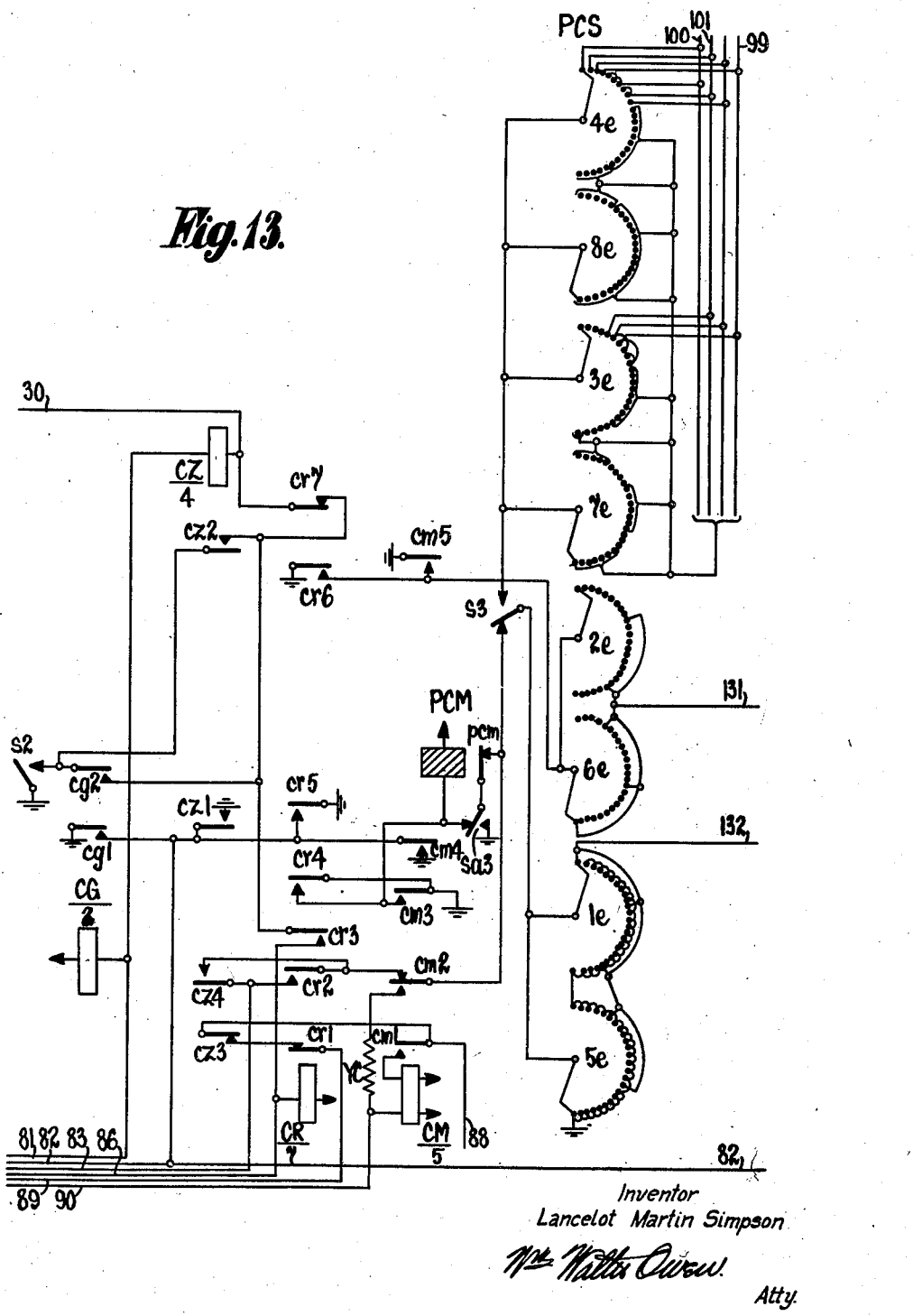
Figure 14:
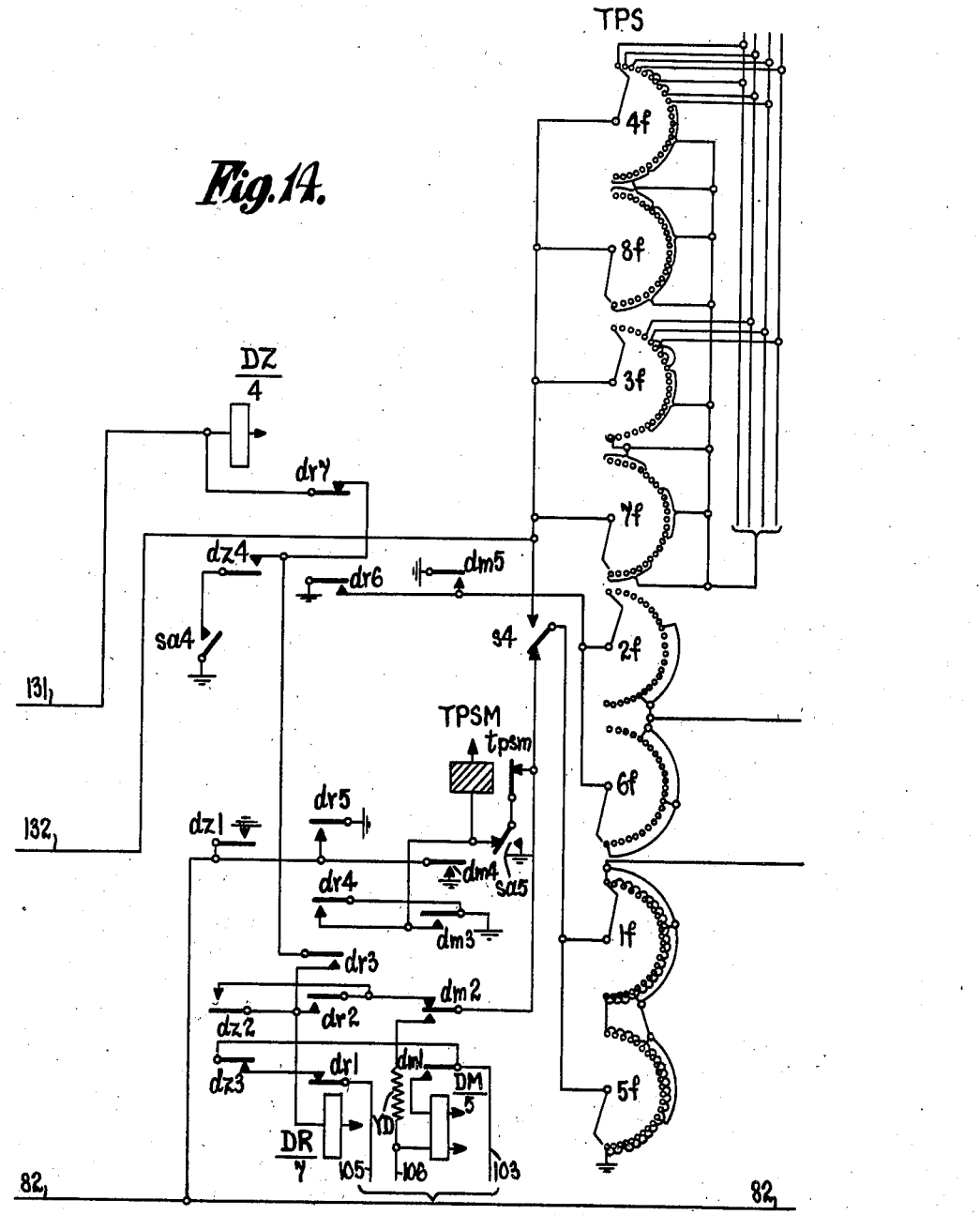

The general operation of the installation having been briefly described, a detailed circuit description will now be given, reference being had to the annexed drawings of which Figs. 1 and 2 show the electrical connections at a typical 1—40 ticket issuing-machine in which accordingly the springs of the "win or place" key for effecting the operation of relay FEC are unwired. Figs. 1 and 2 also show the arrangements whereby a number of machines may be automatically locked or unlocked at will from a central point. Figs. 3, 4 and 5 show the win decoding relay group associated with the ticket-issuing machine of Figs. 1 and 2, and also the change-over relays PB and FEC which serve respectively to change over the signalling leads to another decoding relay group associated with the place totalizing equipment and to separate win and place decoding relay groups associated with horses 41—80. Figs. 6 and 8 show a horse collecting switch HCS which is assumed to be associated with horse No. 1 and is capable of collecting markings corresponding to sales of tickets of different denominations simultaneously. Fig. 7 shows the 2/- to £1 storing group SG1 by means of which ten separate 2/- sales may be counted and transferred to the translated £1 collecting switch TP, Fig. 11, which switch has for its purpose, as mentioned, the collecting of £1 indications which are derived from the storing of 2/- indications and 10/- indications, and the transfer of the collected indications to the one-pound counting switch PCS, Fig. 13, and which is brought into operation immediately a £1 marking is made on its bank contacts. Fig. 9 shows the 10/- to £1 storing group SG3 on which separate 10/- sales may be counted and transferred to the translated £1 collecting switch TP. Fig. 10 shows the stored units collecting switch SUC which is arranged to make two complete revolutions at the end of each selling period for the purpose of collecting up all outstanding markings on the various storing relay groups which have not been collected by the translated £1 collecting switch TP. Fig. 12 shows the 2/- counting switch TWS and the 10/- counting switch TSS, together with the start selling key SB and supervisory lamp SL associated with the particular totalizer and also a main start selling key MSB which controls all the totalizers. Fig. 13 shows the £1 counting switch PCS which controls the operation of the monogram type indicator shown in Fig. 17, which indicator comprises a lamp panel and means for lighting the lamps in various combinations to form and exhibit the various numerals. Fig. 14 shows the £10 counting switch TPS, Fig. 15 the £100 counting switch HPS and Fig. 16 the £1,000 counting switch T*h*PS and the £10,000 counting switch TTPS.

It will be understood that the equipment for only a single horse for registration of win tickets has been shown and that similar equipment will be provided for each horse for both win and place tickets. Moreover a grand total totalizer for both win and place will be required with associated collecting switches, this equipment being substantially identical with that provided for individual horses but obviously of somewhat greater capacity. It will be understood also that each counting switch will have associated with it an indicator similar to that shown in Fig. 17. It should be pointed out that in order to have a full disclosure of the circuits in a single drawing certain equipment has been included in the totalizer which is in a sense alternative but it is thought that the description is simplified by this procedure. Thus if the 10/- storing group shown in Fig. 9 is employed, part of the apparatus associated with the 10/- counting switch TSS in Fig. 12 is not required and in fact the 10/- counting switch could be omitted entirely if the 2/- counting switch were arranged to transfer direct to the £1 counting switch. It should be mentioned also that as a matter of convenience one pole of the source of current has been indicated by an arrow head and will be referred to as battery while the other pole is indicated by an earth symbol and is thus referred to. It is not essential, however, that any earth connection should be employed and the number, nature and voltage of the current supply sources will be determined by requirements. It should be mentioned, also, that in the drawings, the relay windings have been represented as rectangles and have been designated with capital letters while the various armatures of the relays are designated by small characters corresponding to the capital letters of the associated windings and a distinguishing numeral. For example, in Fig. 3, FEC designates the relay winding shown in the upper left-hand portion of the drawings, while *fec1, fec2*, etc., designate the armatures associated therewith. For sake of convenience hereinafter, the relay windings will be termed relays, i. e., relay winding FEC will be termed relay FEC and other relay windings will be correspondingly termed. Likewise, as an assistance in the reading of the drawings, the number of armatures associated with a relay winding and comprising a part of the relay have been indicated on the drawings by the placing of an informatory numeral under the capital letters designating the relay winding. For example, $$\frac{FEC}{7}$$

indicates that relay FEC has seven armatures designated *fec1* to *fec7*, inclusive. The various types of relays, with respect to their characteristics of speed in operation, are distinguished on the drawings in a well-known manner. The ordinary quick-to-operate and quick-to-release relays are indicated by the plain rectangles; the relays which are retarded in their energizations but not materially retarded in their deenergizations are indicated by rectangles having the upper portion thereof filled in solidly in black to designate the copper slugs placed upon the armature ends of the cores according to the well-known practice, and the relays which are retarded in their deenergizations but not materially in their energizations are represented by rectangles the lower portions of which are cross hatched to indicate the copper slugs placed upon the heel ends of cores in accordance with the well-known practice.

Referring now to the assembled circuit, when it is desired to start the selling, the operator at the control position operates the main start selling key MSB, Fig. 12, and also the individual start selling keys such as SB associated with the horse totalizers corresponding to the horses on which selling of tickets is to be permitted. The operation of key MSB connects earth to common conductor 50 while at one set of springs of key SB earth is extended to the supervisory lamp SL to provide an indication that selling is in progress on this particular machine, and at the other set of springs connects earth to relays S and SA in parallel. Since relays S and SA control circuits in Figs. 12-16, some of their armatures have for convenience been shown in detached form, and these are clearly indicated by suitable reference letters. These armatures open the homing circuits of the various counting switches and otherwise prepare the totalizer for operation. Moreover at armature S9, Fig. 12, earth is connected to conductor 51 and at armature S8 earth is extended from conductor 50 over conductor 52 to operate relay BA, Fig. 10, and over armatures *on1* and *tw6* to operate relay MS. Relay BA on operating, at armature *ba1* opens a point in the driving magnet circuit of the stored units collecting switch SUC, at armature *ba3* opens a point in the circuit for relay CG, Fig. 13, and at armature *ba2* completes the circuit of relay BB which operates and locks up by way of armatures *bb2* and *tw1* to earth on conductor 51.

Moreover, at armature *bb1* a point is closed in the driving magnet circuit of the stored units collecting switch SUC and at armature *bb3* earth is connected to the common conductor 53 to provide a holding earth for the relays in the storing groups similar to the 2/- storing group SG1, Fig. 7, and in the 10/- storing group SG3, Fig. 9. Relay MS which energizes at this time is provided with a number of armatures equivalent to the number of horse collecting switches such as HCS, Figs. 6 and 8, required for each horse, this number depending upon the number of ticket-issuing machines from which it is required to collect registrations corresponding to sales of tickets. In the example shown, it is assumed that a single collecting switch is sufficient for collecting the registrations since the number of machines of different denominations is not greater than 200. Each bank contact is wired to a decoding relay group associated with a different ticket-issuing machine, and since there are 25 contacts in each bank and 8 banks are provided, this switch may collect registrations over 200 separate leads. When relay MS is operated, at armature *ms1* earth is connected to the collecting switch start wire 54 which extends by way of the plug and jack points 55, Fig. 6, interrupter springs *hcm* of the horse collecting switch magnet HCM, plug and jack points 56, winding of interrupter relay SR, winding of low resistance alarm relay CA to battery.

In connection with the plug and jack points 55 and 56, it may be mentioned at this point that various points in the circuits shown in Figs. 6 and 8 are similarly intercepted, and that the leads associated with the horse collecting switch terminate in a cord and plug which may be inserted in the jack associated with any horse totalizer. This arrangement is a great convenience since it permits the collecting switches and totalizers to be associated in any desired manner and in particular permits totalizers with which are associated indicators arranged in consecutive numerical order to be used in conjunction with collecting switches corresponding to horses whose numbers on the race card are not in consecutive numerical order. The necessary plug and jack connections are readily made before ticket selling starts and the number shown on the indicator relating to a particular totalizer is made to agree with the number of the particular horse collecting switch associated therewith. The changing of this number may be effected manually, for instance, by inserting a card bearing the horse number in a slot provided, or alternatively the change may be effected automatically by means of a lamp display such as more fully described in specification Serial No. 430,414.

Considering now the operation of relay SR at armature *sr1* it prepares a point in the circuit to the impulsing relay IA, Fig. 7, at armature *sr2* completes a circuit by way of the plug and jack points 57 for the driving magnet HCM, at armature *sr3* closes a point in the circuit of relay CG, Fig. 13, at armature *sr4* closes a point in the circuit for relay CM, Fig. 13, at armature *sr5* prepares a circuit for the impulsing relay similar to IA associated with the second 2/- storing group, at armature *sr6* prepares a circuit for the impulsing relay IF associated with the 10/- storing group, Fig. 9, and at armatures *sr7* and *sr8* prepares points in the £10 and £100 impulsing circuits respectively. The magnet HCM of the horse collecting switch HCS is now energized and at its interrupter springs *hcm* opens the circuit of relay SR which de-energizes and at armature *sr2* opens the energizing circuit of the magnet HCM which releases in turn and causes the wipers 1—8 of the switch HCS to be advanced to the next set of bank contacts. Inter-action between relay SR and magnet HCM causes the wipers of the horse collecting switch HCS to be continuously rotated over the banks in search of markings from the various ticket-issuing machines, and the manner in which these markings are provided will now be described in detail.

Referring now to Figs. 1 and 2, the ticket-issuing machine there shown is provided with a common "win or place" key and also a separate key for each runner and the operation of these keys is conveniently arranged to select the required type and there initiate the printing and issuing operation without the necessity for operating a special start key. The operation of each key also effects a particular code connection to a group of six leads extending to the main totalizing equipment, and the combinations are so arranged that in conjunction with the decoding relay group shown in Figs. 3, 4 and 5, 40 separate signals may be obtained. It will be assumed that the ticket-issuing machine shown in Figs. 1 and 2 is of 2/- denomination and that a request has been made for one 2/- ticket for a win on horse No. 1. The operator at the ticket machine will thereupon operate the horse key No. 1, and will also operate the two position "win or place" key to the win position. It may be mentioned in passing that if the ticket machine in question had been one for issuing tickets on horses 41—80 instead of 1—40 as shown, the springs of the "win or place" key would be wired so as to connect earth over conductor 58 to operate relay FEC, Fig. 3, which thereupon extends the coding leads from the runner keys to another decoding relay group which is arranged to produce markings in the banks of the horse collecting switches for sales of tickets on runners 41—80.

The runner key and the "win or place" key are locked in their operated positions by a mechanical device which also causes the type for this particular runner to be set in line for printing, and the following electrical circuit is completed by the operated runner key: earth at the mechanical contacts Z, Fig. 2, which are closed upon the full operation of any runner key, armature *be2*, winding of relay T, conductor 59, operated springs of runner key 1, conductor 60, armatures *fec2*, *pb1* and *swr1*, lower winding of relay A, winding of relay P to battery. Relays P, A and T now operate in series and the latter relay at its armature *t1* completes a circuit for the slow-to-operate relay BE, which on operation locks up to earth by way of its own armature *be1* and make contact and the mechanical contact Z, and at armature *be2* opens the circuit previously traced to the decoding relay group, thereby ensuring that earth pulse of definite length is always extended upon the operation of any key, irrespective of the length of time the key remains operated. Relay A in the decoding group on operation at armature *a1* completes a locking circuit by way of its upper winding over conductor 61, armatures *it1*, *cr2* and *cr1* to earth so that relay A is held independently of the earth from the ticket-issuing machine. When this earth is removed however in the manner already described, relay P releases and permits the full operation of two-step relay SW which previously operated its light armature *sw1* only owing to the energization of its upper winding from earth at armature *p1* and prepared a locking circuit for itself to conductor 62. When relay SW operates fully at armature sw2 a locking circuit is prepared over conductor 63 for relay IT, Fig. 4, and at armature sw3 a circuit is completed for relay SWR which then operates and at armatures swr1—swr6 opens the coding leads from the ticket-issuing machine to prevent further signals being received until the one in question has been collected, at armature swr7 prepares a circuit for the upper winding of the alarm relay SP, the function of which will be described at a later period, and at armature swr8 extends a marking to the bank of the horse collecting switch HCS over the following circuit: earth, armature swr8, winding of relay TR, armature it4, conductor 64, armatures a2, b2, c3, d5, e6, f8 and a10, conductor 65, to the first bank contact associated with wiper 1 of the horse collecting switch HCS.

Since the wipers of this switch are continuously rotating as previously described, wiper 1 will in due course encounter the marked bank contact 1, whereupon the earth by way of the low resistance relay TR will be extended by way of the plug and jack points 66, conductor 67, armatures ub4, ui3, and uz1 and uj3 in parallel, conductor 68, armature sr1, conductor 69, upper winding of the impulsing relay IA to battery. Relay IA operates in this circuit and at armature ia1 connects low resistance battery by way of its lower winding to wiper 1 to effect the operation of relay TR in the decoding relay group, Fig. 4, at armature ia2 connects earth to conductor 70 to hold the driving magnet HCM energized to prevent any further rotation of the switch wipers at this moment, and at armature ia3 connects earth over armature ua3 to the lower winding of the two-step relay UA which thereupon energizes partially and operates only its light armature ua1 to prepare a locking circuit for itself. Relay TR, Fig. 4, upon operating, at armature tr1 connects battery through the winding of relay Q to conductor 71 and at armature tr2 completes the circuit of relay IT which operates and locks up over armature it2 to earth at armature sw2, Fig. 3. Relay IT moreover at armature it1 opens the holding circuit for the decoding relays A, B, C, D, E and F, so that relay A which was operated is now released, at armature it5 completes an alternative circuit over conductor 73 for relay SWR, at armature it3 opens the cancellation circuit over lead 75 to prevent cancellation of the set-up at this time, at armature it6 extends earth by way of the lower winding of relay CR over conductor 74 to mark the bank of the total collecting switch, and at armature it4 opens the circuit of relays TR and IA, Fig. 7. Upon the release of relay IA earth is disconnected at armature ia3 from the junction of the windings of relay UA so that this relay now operates fully over both windings in series and locks up to earth on conductor 53. Furthermore since relay IA is now released, earth at armature ia2 is disconnected from the driving magnet HCM of the horse collecting switch which may now inter-act with relay SR as before in order to advance the wipers in search of further markings from other ticket-issuing machines.

Considering now the operations at the ticket-machine, Figs. 1 and 2, relay R is operated over conductor 71 in series with relay Q which has locked up over armature q1. Relay R at its armatures r1 and r2 which are connected in parallel completes the circuit of the latching magnet LAM upon the operation of which the knife switch KNS is closed to complete the circuit to the motor MOR which supplies the necessary drive for printing the ticket, cutting it off, and issuing it to the purchaser. When this has been done the runner key and the "win or place" key are mechanically released and the mechanical contacts Z are also opened, whereupon relay BE is restored to normal, and the circuit of relay R and relay Q, Fig. 4, is opened. Although the ticket has now been issued to the purchaser the decoding relay group is not restored for further use until relay SWR is released, and this is not effected until the marking extended by way of the lower winding of relay CR over conductor 74 is picked up by the total collecting switch in a similar manner to that described in connection with the horse collecting switch HCS. When the appropriate wiper of the total collecting switch engages with the marked bank contact, the impulsing relay in the totalizer will be operated and relay CR, Fig. 4, will be operated from the low resistance battery then extended back, and at armature cr1 it opens the holding circuit of relay SW, Fig. 3, which releases and in turn opens the holding circuit to relay IT, Fig. 4, at armature sw2. Upon the release of relay IT, the circuit of the lower winding of relay CR is opened at armature it6, and at armature it5 relay SWR is released so that the coding leads from the ticket-issuing machine are now again connected to the decoding relay group. It will be appreciated that by this arrangement it is not possible to register a further ticket sale until the previous one has been duly recorded on both the horse and grand total totalizers.

Considering now the further operation of the storing group SG1, Fig. 7, relays UA to UI will be operated in turn from the various markings picked up by wipers 1 and 5 of the switch HCS and when the tenth marking has been collected relay UJ is operated and at its armature uj4 a circuit is completed for relay UZ which thereupon locks up at its armature uz5 to earth on the common conductor 53. Furthermore at armature uz2 the holding circuit of the storing relay UA is opened, and as each storing relay is locked up from contacts on the preceding relay, it will be seen that they are all released in succession, this method of release being slightly quicker than if all the relays were locked up in parallel, in which case the mutual shunting effect of the various windings would produce a slight slugging effect on the relays. Moreover, at armature uz1 the initial energizing circuit for the impulsing relay IA is opened, and at armatures uz3 and uz4 the following marking circuit is completed to the bank of the £1 translating switch TP, Fig. 11: earth, armatures uz4 and uz3 over conductor 77 to bank contact 1 associated with wiper 2a of the £1 translating switch TP. Furthermore the earth applied to conductor 78 by armature uz4 completes a circuit for relay ZC which opens a point in the driving circuit of the storing units collecting switch SUC though this operation is without function at this time. It should be mentioned that the banks of the £1 translating switch TP are connected to all the various 2/- storing groups similar to SG1, and also to the 10/- storing groups similar to SG3, Fig. 9, and in case the wipers of the switch happen to be resting on contacts other than those marked by the operation of relay UZ, the following circuit will be completed: earth, armature uz4, conductor 78, armatures corresponding to uz3 and ur2 and conductor corresponding to conductor 79 in another storing group, bank contact and wiper 1a of the switch TP, interrupter springs and driving magnet TPM to battery by way of the low resistance feed relay BP. Relay BP and the magnet TPM are therefore operated in series, the former preparing various alarm circuits which will be described later, while the operation of the magnet causes its circuit to be opened at the interrupter contacts and it therefore releases, and effects the advance of the wipers to the next set of contacts in the well-known manner. The magnet TPM is therefore energized in a self-interrupted circuit and the wipers are advanced until the bank contact marked by the absence of earth potential is encountered by wiper *1a* whereupon the switch comes to rest.

When the interrupter relay SR associated with the collecting switch HCS next operates after the wipers of the £1 translating switch TP encounter the marked bank contact, the following circuit may be traced: earth, armatures *uz4* and *uz3*, conductor 77, bank contact and wiper *2a* of the £1 translating switch TP, conductor 80, armature *sr3*, Fig. 6, conductor 81, winding of relay CG, Fig. 13, to battery. Relay CG thereupon operates and at armature *cg1* extends earth over conductor 82 to maintain the driving magnet HCM energized, and at armature *cg2* prepares a circuit for relay CZ, which is however short-circuited and therefore unable to operate at this time. Since the driving magnet HCM is thus held in an operated position, relay SR will be released at interrupter contacts *hcm*, whereupon the initial energizing circuit of relay CG is opened and it is held in series with relay CZ over the following circuit: earth, armatures *s2*, *cg2* and *cr7*, winding of relay CZ, winding of relay CG to battery. Relay CZ on operating at this time, at armature *cz1* completes a further holding circuit for the driving magnet HCM, at armature *cz2* provides a locking circuit for itself, at armature *cz3* opens the circuit of the direct £1 registration lead, which will be dealt with later, and at armature *cz4* completes the following circuit: earth, armature *sa3*, interrupter springs *pcm*, armatures *cm2* and *cz4*, conductor 83, wiper *3a* and bank contact of the switch TP, Fig. 11, conductor 84, winding of relay UR, Fig. 7, to battery. Relay UR upon operating in this circuit locks up by way of armature *ur1*, at the same time opening the holding circuit for relay UZ, at armature *ur2* opens a point in the marking conductor 79 extending to the bank of wiper *1a* of the switch TP, and at armature *ur3* extends earth over conductor 85, bank contact and wiper *4a* of the switch TP, conductor 86, winding of relay CR, Fig. 13, to battery. Relay CR on operating, at armature *cr3* locks itself up over armatures *cz2* and *cg2* in parallel to earth at armature *s2*, at armature *cr5* connects a further earth to conductor 82 to hold the magnet HCM, at armature *cr2* provides a holding circuit for relay UR, at armature *cr7* opens the circuit of relays CZ and CG, and at armature *cr4* extends earth to the driving magnet PCM of the £1 counting switch PCS. Upon the energization of the magnet PCM the interrupter springs *pcm* open the circuit of relay UR, Fig. 7, which accordingly releases provided that relay UZ has already released, and at armature *ur3* brings down relay CR, Fig. 13, provided that relays CZ and CG have released. Upon the release of relay CR the circuit of magnet PCM is opened at armature *cr4* and it de-energizes and causes the wipers of the £1 counting switch PCS to be advanced one step thereby increasing the total amount on the display by £1. It will be appreciated from the various revertive check circuits which have been traced that in the case of a failure of any one element in the chain, it will be impossible for a sale to be incorrectly registered and under these conditions an alarm will be given until the trouble is rectified, this circuit being described later.

A description has now been given of the storing of 2/- registrations and their transfer to the £1 counting switch PCS, Fig. 13, and as this switch is also receiving direct £1 registrations from wiper 7 of the horse collecting switch HCS, Fig. 8, a description will now be given of the circuit arrangements provided to prevent interference between the two sources.

Figure 11:
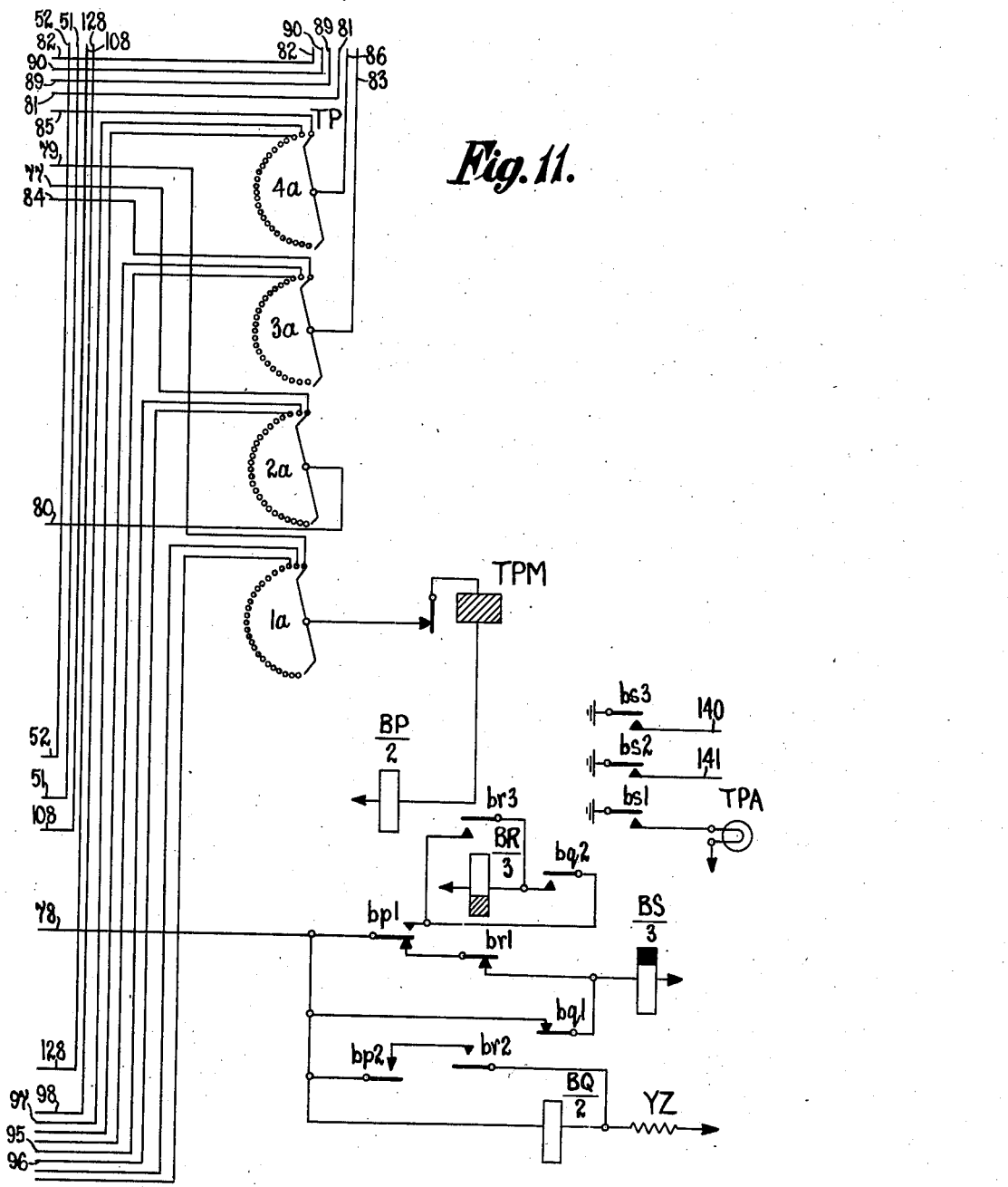

It will be assumed that wiper *2a* of the translated £1 switch TP, Fig. 11, encounters a marked bank contact at the same instant as the wiper 7 of the horse collecting switch HCS, Fig. 8. The interrupter relay SR will be operated at this time so that relay CG will energize over the circuit previously traced and at the same instant the following circuit is completed for relay CM: earth from the decoding relay group associated with a £1 ticket issuing machine, bank contact and wiper 7 of the switch HCS, Fig. 8, plug and jack points 87, conductor 88 which is connected to conductor 88, Fig. 13, armatures *cz3* and *cr1*, conductor 89, armature *sr4*, Fig. 6, conductor 90, lower winding of relay CM to battery. Relay CM thereupon operates and at armature *cm2* completes a locking circuit for itself by way of resistance YC and the interrupter springs *pcm* and at armature *cm1* connects low resistance battery by way of its upper winding over conductor 88 to wiper 7 of the switch HCS to effect the operation of a relay similar to TR in the associated £1 decoding relay group which is identical with that described in connection with the 2/- ticket-issuing machine and permits the issue of a £1 ticket to the purchaser in the manner already described. Relay CM moreover at armature *cm4* extends earth over conductor 82 to hold the driving magnet HCM of the collecting switch, and at armature *cm3* extends earth to the driving magnet PCM to the £1 counting switch. Upon the energization of the magnet PCM the associated interrupter springs *pcm* open the holding circuit of relay CM, which therefore releases and at armature *cm3* opens the energizing circuit of the magnet PCM to cause the wipers of the switch PCS to be advanced on to the next set of bank contacts. As regards the translated £1 registration which is awaiting transfer, relay SR is released owing to the magnet HCM being held in an energized condition, and therefore relay CZ is permitted to operate in series with relay CG in the manner already described. Relay UR, Fig. 7, however, cannot operate until relay CM and the magnet PCM have released after the direct £1 marking has been duly registered on the £1 counting switch PCS. Upon the release of relay CM, relay UR is operated in a circuit which includes the resting armature *cm2*, and the operations previously described are then carried through to cause a further marking corresponding to the translated £1 to be duly registered on the £1 counting switch PCS.

A description will now be given of the collection of 10/- markings which is made over wiper 3 of the horse collecting switch HCS, Fig. 8. When wiper 3 encounters a marked bank contact, earth through a low resistance TR relay is extended by way of the plug and jack points 91, conductor 92, armatures ca2 and uy5 in parallel, conductor 93, armature sr6, conductor 94, upper high resistance winding of impulsing relay IF to battery. Relay IF is operated in this circuit and at its armature if2 extends a low resistance battery by way of its lower winding over the conductor 92 to effect the operation of the TR relay in the decoding relay group associated with the 10/- ticket-issuing machine. Relay IF is released when the ticket-issuing operations have been duly completed and since a circuit was completed for the lower winding of the two-step relay AA by way of armature if1, this relay now operates fully over its two windings in series in the circuit: earth on common conductor 53, armatures ca3 and aa1, both windings of relay AA in series to battery this operation representing the storage of one 10/- sale. When wiper 3 of the collecting switch HCS again encounters a marked bank contact, relay IF is again operated over the circuit previously traced and on this occasion earth at armature if1 is extended over armatures ca6, aa3 and ba2, lower winding of relay BA to battery. Relay BA operates its light armature ba1 and when the ticket-issuing operations have been completed, relay IF again releases and relay BA operates fully on both windings in series to earth at armature aa4. Relay BA thereupon at armature ba4 prepares a circuit for relay UW, and at armature ba3 completes a circuit for the lower winding of relay CA which thereupon locks up over its upper winding by way of armatures ca4 and cb5 to earth on common conductor 53. Upon the operation of relay CA a circuit is completed at armature ca5 for the lower winding of relay UW to cause it to operate its light armature uw1, at armature ca6 the impulsing circuit from relay IF is transferred to the next storing group, at armature ca3 the holding circuit of relay AA is opened and at armature ca1 a locking circuit is prepared dependent upon relay UW. Upon the release of relay AA the locking circuit of relay BA is opened at armature aa4 so that this relay also releases and at armature ba4 removes the short-circuit from the upper winding of relay UW, whereupon this relay operates fully over its two windings in series. Relay UW, it will be realized, corresponds to relay UZ associated with the 2/- storing group in Fig. 7, and to function in conjunction with relay RW is to effect a suitable marking in the bank of the switch TP. Relay UW at armature uw4 extends earth over armature uw3 and conductor 95 to a contact in the bank 2a of the translated £1 switch TP, Fig. 11, in order to prepare for the operating of relay CG, Fig. 13, in the manner already described. Similarly at the resting contacts associated with armature uw3, the appropriate bank contact of bank 1a of the switch TP is marked by the removal of earth potential from conductor 96, while at armature uw4 earth is also extended over conductor 78 by way of the resting contacts similar to uy3 and ry3, Fig. 9, and the resting contacts similar to uz3 and ur2 of all 2/- storing groups to the bank contacts of bank 1a, and in this manner the translated £1 switch is caused to rotate to find the marked bank contact corresponding to the storing of two 10/- units on the storing group SG3, Fig. 9.

It will be seen that further 10/- markings encountered by wiper 3 of the horse collecting switch HCS, Fig. 8, will operate the impulsing relay IF, Fig. 9, again, and the impulses will now be transmitted by way of armature ca6 to the lower group of storing relays CB, AB, BB, UY and RY, the operation of which is substantially the same as that described for the upper group.

When the £1 translating switch TP, Fig. 11, finds the marked contact the magnet TPM will not again energize owing to the absence of earth thereon, and earth from conductor 95, Fig. 9, will be extended over wiper 2a of the switch TP to energize relay CG associated with the £1 counting switch PCS, Fig. 13. Relay CG operates as previously described and at armature cg1 extends earth over conductor 82 to hold the collecting switch magnet HCM, and at armature cg2 prepares a circuit for relay CZ. When relay SR de-energizes, relay CZ operates and at armature cz4 completes the following circuit for relay RW in the 10/- storing group, Fig. 9: earth, armature sa3, interrupter springs pcm, armatures cm2 and cz4, conductor 83, wiper 3a and second bank contact of the switch TP, conductor 97, winding of relay RW to battery. Relay RW operates and at armature rw2 completes a holding circuit dependent on relay UW and opens the circuit of this relay and at armature rw1 connects earth over conductor 98, second bank contact and wiper 4a of the switch TP and conductor 86 to operate relay CR. As already explained, the operation of relay CR causes the magnet PCM of the £1 counting switch PCS to advance the associated wipers one contact in order to increase the total by £1, and relay RW is released owing to the opening of its circuit at the magnet interrupter springs. In this case also the check-back circuits operate in the manner previously explained to ensure all the operations have been carried through satisfactorily. Although only two 10/- storing groups are shown in Fig. 9, it will be appreciated by those skilled in the art that other groups could readily be added if the traffic handled by the 10/- ticket-issuing machines was sufficient to warrant an increase in the storing means.

A description will now be given of the arrangements whereby the movement of the wipers of the £1 counting switch controls the indicator unit shown in Fig. 17, by means of a group of four relays designated A, B, C and D which may be operated in various combinations to complete circuits for a particular one of ten relays similar to relay 3L, each of which effects the lighting of lamps to display a numeral corresponding to the position of the switch wipers. If the wipers of the switch PCS have been moved into engagement with the fourth set of bank contacts in response to three separate £1 registrations, the following circuit is effective: earth, by way of the bank commoning associated with wiper 5e, armature s3, wiper 4e and fourth bank contact, conductor 99, winding of relay D associated with the indicator unit to battery. Relay D on operating, completes a circuit from earth by way of armatures a1, b2, c3 and d4 winding of lamp control relay 3L to battery. Relay 3L on operating at its armatures 1—12 completes circuits for the appropriate lamps of a monogram indicator which are arranged as shown in the top left-hand corner of Fig. 17. When the wipers of the £1 counting switch PCS are moved into engagement with the fifth set of bank contacts upon the registration of a further £1 sale, a circuit is completed over conductors 100 and 101 to effect the operation of relays A and B in Fig. 17, and under these conditions, the lamp relay 4L which is not shown is operated to complete circuits for the appropriate lamps in the monogram for displaying the numeral 4. Hence as the wipers of the £1 counting switch PCS continue to move round the banks contact by contact, the relays A, B, C and D in Fig. 17 are operated in various combinations to effect the display of numerals on the monogram unit corresponding to the position of the wipers of the switch.

When the £1 counting switch PCS is standing on the tenth set of contacts and the tenth £1 is about to be registered, relay DZ, Fig. 14, will be operated from earth, armature cr6 or armature cm5, depending on whether the registration is being made from the translated or direct source, wiper 2e and tenth bank contact, conductor 131, winding of relay DZ to battery. Relay DZ on operating, completes a locking circuit for itself at armature dz4, at armature dz1 connecting earth to conductor 82 to hold the driving magnet HCM of the horse collecting switch HCS, at armature dz3 opens the circuit for the reception of the direct £10 impulses over conductor 103, and at armature dz2 completes the following circuit: earth, armature sa5, interrupter springs tpsm, armatures dm2 and dz2, winding of relay DR to battery. Relay DR thereupon operates and at armatures dr2 and dr3 completes locking circuits for itself and opens the circuit of relay DZ at armature dr1. Relay DR moreover at armature dr5 connects a further earth to conductor 82, and at armature dr4 causes earth to be extended to the £10 counting switch driving magnet TPM. The magnet TPM is thereupon energized in this circuit, and at its interrupter springs opens the circuit of relay DR which accordingly releases provided relay DZ has already released, and as the circuit of the driving magnet TPM is then opened the wipers of the £10 counting switch TPS are moved on to the next set of bank contacts to advance the total by £10, and as the various earth connections are now removed from conductor 82, the collecting switch HCS is permitted to continue its operation. It will be understood that the upper banks of the £10 collecting switch TPS are wired to a relay-controlled indicator of the type shown in Fig. 17 in the same manner as the corresponding banks of the switch PCS, so that the proper numeral may be displayed thereon. Since the wipers of the £1 counting switch PCS are now ready to begin a further units cycle, the proper display is the digit 0 which is effected by the energization of relay A, Fig. 17, as may be seen from the wiring of the switch banks.

In connection with the displaying of "0" on the various indicators, it will be seen that earth is not ordinarily connected to the indicator-controlling wipers until the switch has made one step into engagement with the earthed bank commoning for wipers 1 and 5. It might happen however that a £10 sale is registered on the £10 counting switch TPS before the £1 counting switch PCS has moved from its home position, and in this case means must be provided for lighting up the digit "0" on the £1 indicator in spite of the fact that the wipers have not moved from their normal position. It will be seen that when a £10 registration is made on the £10 counting switch TPS, the wipers 1f—8f are moved into engagement with the second set of bank contacts and in this position earth encountered by wiper 1f will be extended over armature s4, conductor 132, first bank contact and wiper 1e of the £1 counting switch PCS, armature s3, to the indicator controlling wipers shown in the upper portion of the figure. Since these wipers are standing on the first set of bank contacts, earth will be extended over conductor 100, to cause relay A, Fig. 17, to be operated for the purpose of completing the circuit of the lamp relay OL (not shown) to light up the numeral "0" on the £1 counting switch indicator.

Returning now to consideration of the horse collecting switch HCS shown in Figs. 6 and 8, it will be appreciated that £10 and £100 markings are also being collected over the wipers 4 and 8, but since the issuing speed of tickets of these denominations is not likely to be heavy, storing relay groups such as described for the 2/- and 10/- tickets have been dispensed with, and the markings are extended direct to the appropriate totalizers in the same manner as £1 markings. Thus when wiper 4 encounters a marking from a £10 decoding relay group, earth by way of a TR relay therein will be extended by way of wiper 4 and the plug and jack points 104, conductor 103 which is connected to conductor 103 in Fig. 14, armatures dz3 and dr1 from conductor 105 to conductor 106 by way of armature sr6, Fig. 8, lower winding of relay DM to battery. Relay DM thereupon operates and locks up over resistance YD, armature dm2, interrupter springs tpsm, armature sa5 to earth, and furthermore at its armature dm1 extends a low resistance battery by way of its upper winding over conductor 103 to effect the operation of the TR relay in the £10 decoding relay group and permit the issue of a ticket. Relay DM also at its armature dm4 connects earth to conductor 82 to hold the magnet HCM of the horse collecting switch, and at armature dm3 completes the circuit of the driving magnet TPSM of the £10 counting switch which energizes and at its interrupter springs opens the holding circuit of relay DM. Upon the release of relay DM the circuit of magnet TPM is opened at armature dm3, whereupon the wipers of the £10 counting switch TPS are advanced on to the next set of bank contacts to increase the total by £10, and as earth is also disconnected from the conductor 82, the magnet HCM is released to permit the horse collecting switch HCS to continue its operation.

Figure 15:
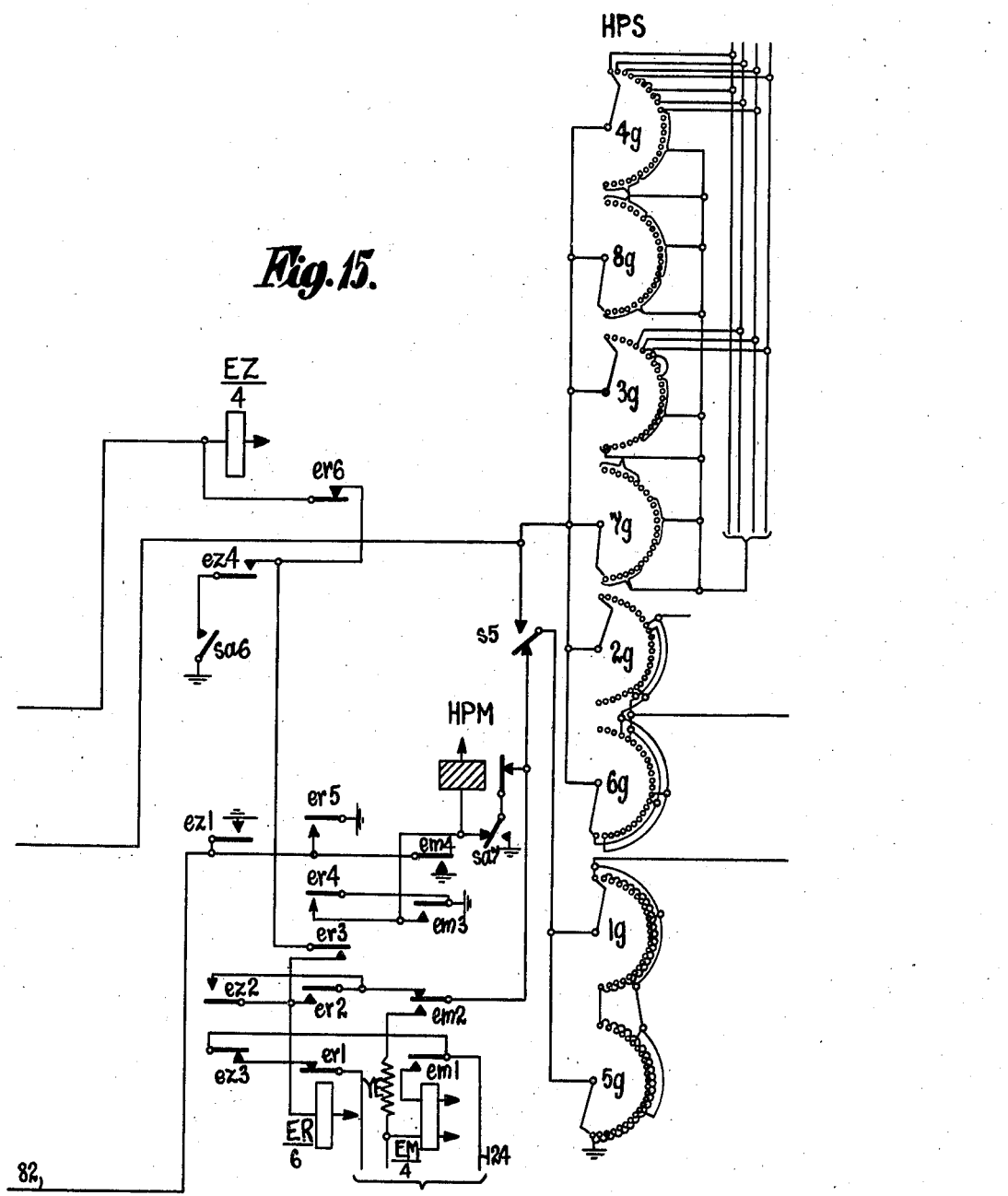

In similar manner the £100 markings picked up by wiper 8 of the horse collecting switch HCS are extended over plug and jack points 123 and lead 124, armatures ez3 and er1, conductors 125 and 126 which are connected by armature sr8, Fig. 8, to relay EM, Fig. 15. This operates in a manner which will be readily followed from what has already been described to energize the driving magnet HPM of the £100 counting switch HPS, and effect the advance of the wipers 1g—8g one step. Similarly when ten £10 registrations have been made on the £10 switch TPS, relays EZ and ER associated with the £100 counting switch will be brought into operation to transfer the marking to the driving magnet HPM of the £100 counting switch.

Figure 16:
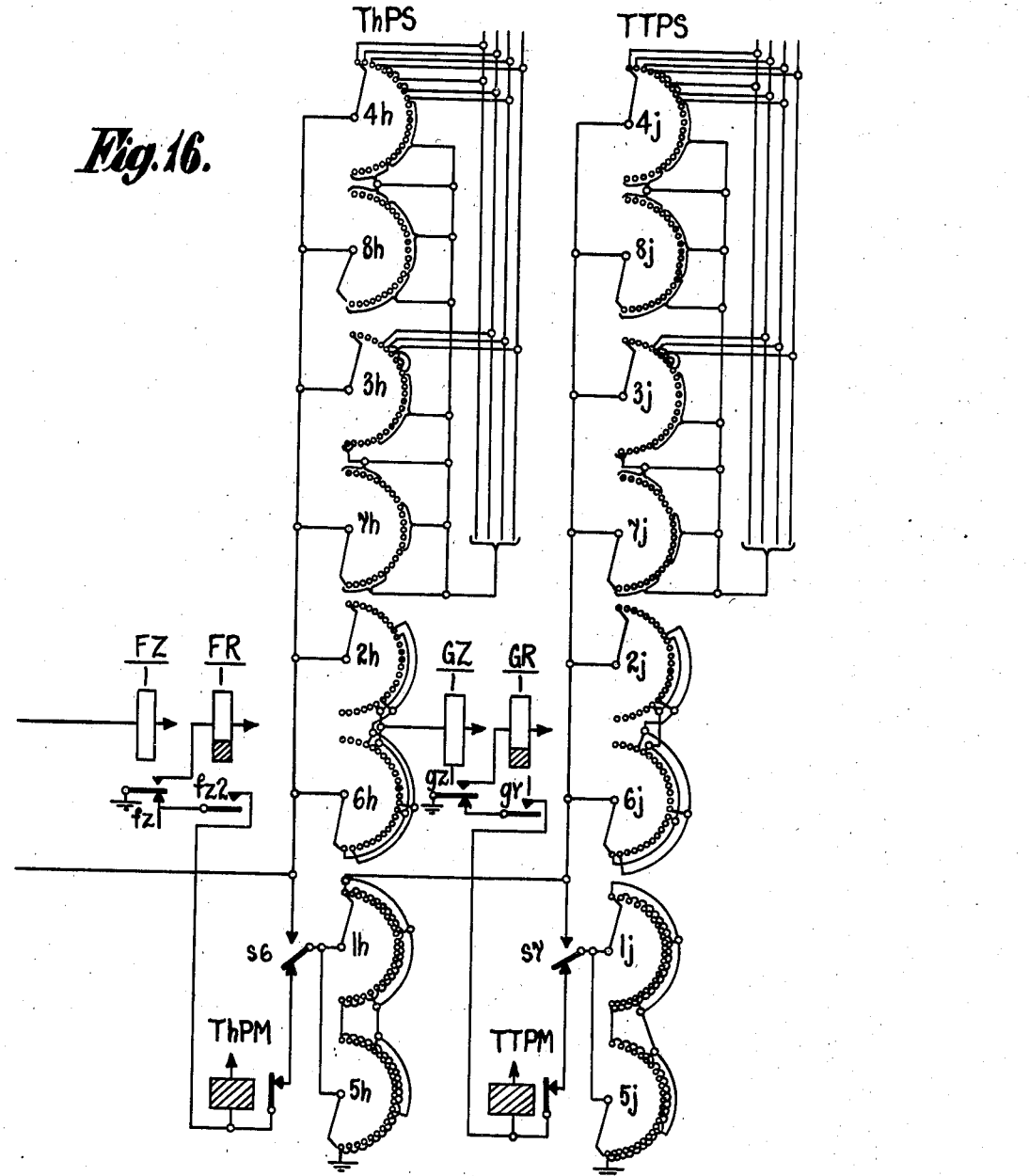

Since, in the particular example described, tickets of £1,000 and £10,000 are not issued, the apparatus associated with the £1,000 counting switch ThPS and the £10,000 counting switch TTPS, Fig. 16, is considerably simplified and consists essentially of a pair of relays one of which is slow to release. The circuit operation is that when the wipers of the £100 counting switch HPS advance into their tenth position in response to the reception of nine separate £100 registrations, earth connected over wiper 1g, armature s5 and wiper 2g will cause relay FZ to operate and in turn operate relay FR. When wiper 2g moves past this position in response to a further £100 registration relay FZ will be released and during the slow release period of relay FR an impulse will be extended to the driving magnet ThPM to cause the wipers of the £1,000 counting switch ThPS to be advanced one contact to increase the thousands digit by one. Similarly when nine £1,000 sales have been registered, wiper 2h of the switch ThPS will encounter the bank contact which is wired to relay GZ, and when the wipers move past this position relay GZ will be released, so that during the slow release period of relay GR an impulse will be extended to the driving magnet TTPM to cause the wipers of the £10,000 counting switch TTPS to move one contact to increase the £10,000 digit by one unit. In case any further digits were required, similar counting switches would be provided controlled in the same way.

From what has already been said it will be realized that it is likely that at some period in the operation, the condition will arise when the £10 counting switch TPS is called upon to receive registrations from both the direct and indirect sources at substantially the same instant, and the circuit arrangements provided for ensuring that separate registration shall be made for each indication under these conditions, though generally similar to those associated with the £1 counting switch will be considered briefly.

Assume that while the switch PCS is indicating 9 wiper 7 and wiper 4 of the horse collecting switch HCS encounter marked bank contacts at the same instant; circuits will accordingly be completed in the manner previously described for relay CM associated with the £1 counting switch PCS, Fig. 13, and relay DM associated with the £10 counting switch TPS, Fig. 14. Relay CM on operating in addition to performing its usual functions, at its armature cm5 completes a circuit over wiper 2e or 6e and conductor 131 for relay DZ, which operates and locks up at armature dz4 so that it remains energized when the wipers of the £1 counting switch PCS are advanced on to the next set of bank contacts on the release of relay CM. Relay DZ also at armature dz1 extends earth over conductor 82 to hold the magnet HCM of the horse collecting switch HCS, and at armature dz2 prepares a circuit for relay DR which circuit is at present held open at armature dm2 and the interrupter springs associated with the magnet TPM. When now the wipers of the switch TPS have been advanced on to the next set of bank contacts in response to the reception of the direct £10 registration and the magnet TPM and relay DM are de-energized, relay DR is operated to complete the circuit of the driving magnet TPM again and the wipers are therefore moved another step. Thus both the translated registration and the direct registration to the £10 switch TPS are correctly registered even though both make appearance at substantially the same instant. Similar considerations will apply in connection with the £10 switch TPS and the £100 switch HPS, and similar circuits are provided to prevent interference resulting.

When the end of the selling period is reached, the main start selling key MSB, Fig. 12, is restored to normal by the control operator, whereupon earth is removed from the common conductor 50, which extends to the operated contacts of the S relays associated with all totalizers in service. Since, therefore, earth is removed from conductor 52, relays BA and MS, Fig. 10, are released. Upon the release of relay MS, earth at armature ms1 is disconnected from the collecting switch start conductor 54 so that no further circuit is completed for relay SR and the switch HCS is brought to rest. When the translated £1 switch TP has completed its final operation, relay ZC, Fig. 10, will be released since earth is no longer connected to the common conductor 78 and owing to the release of relay BA, the following circuit is completed: earth, armatures zc1, ba1 and bb1, first bank contact and wiper 5b of the stored units collecting switch SUC, interrupter springs sum, winding of interrupter relay IR to battery. Relay IR operates in the circuit described and at its armature ir1 completes the circuit of the driving magnet SUM which therefore energizes and at its interrupter springs sum opens the circuit of relay IR so that this relay will in turn release and open the circuit of the driving magnet SUM, whereupon the wipers will be advanced on to the second set of bank contacts. In this position, wiper 5b encounters the bank commoning which is connected to earth and relay IR will thereafter be energized in this circuit and its interaction with the driving magnet SUM will cause the wipers to be automatically rotated over the bank contacts. It should be mentioned that one armature of each of the storing relays except the last in the storing groups such as SG1, Fig. 7, is wired to the upper bank of the stored units collecting switch SUC, while similarly one armature of the first relay of each of the 10/- storing relay groups shown in Fig. 9 is wired to five bank contacts of the switch SUC in order to provide a marking equivalent to five 2/- units.

Assuming that certain storing relays are operated at this time so that wiper 8b of the switch SUC encounters a marking during the automatic rotation of the switch, the following circuit will be completed for operating the 2/- counting switch TWS, Fig. 12: earth, bank contact and wiper 8b, armatures tw3 and ir2, conductor 108, upper winding of relay AM to battery, thereby causing this relay to operate and complete a locking circuit for its lower winding over resistance YA, armature am3, interrupter springs twm and armature am4 to earth. Relay AM also at armature am2 connects earth to conductor 128 to hold the driving magnet SUM to prevent any further rotation of the stored units collecting switch SUC at this moment, at armature am5 connects earth to wiper 2c of the 2/- counting switch TWS for a purpose which will be described later, and at armature am4 completes a circuit for the driving magnet TWM. Magnet TWM upon energizing opens the locking circuit of relay AM which releases and releases the magnet also so that the wipers of the 2/- counting switch TWS are advanced one step to increase the display by one 2/- unit, and since earth is now removed from conductor 128 the magnet SUM is unlocked to permit the further operation of the stored units collecting switch SUC. It will be seen that the release of relay IR opens the circuit for the upper winding of relay AM at armature ir2 so that this relay shall not be retained in an operated position over this winding. It will be understood that the movement of the wipers 3c and 4c of the 2/- counting switch TWS controls the application of earth potential over conductors 109—112 in a suitable combination to effect the operation of relays in an indicator similar to that shown in Fig. 17.

When registration of the fifth 2/- unit is being made wiper 2c is in engagement with bank contact 5 which is wired to relay BZ, and upon the operation of relay AM, earth at armature am5 is extended by way of wiper 2c and bank contact to effect the operation of relay BZ which then locks up at armature bz1. Relay BZ also at armature bz2 locks the magnet SUM and at armature bz3 completes a circuit for relay BR which then locks up over armatures br2 and br3 and at armature br6 opens the circuit for relay BZ which thereupon releases. Relay BR also at armature br4 connects earth to the magnet TSM of the 10/- counting switch TSS which at its interrupter springs tsm opens the holding circuit for relay BR which releases if relay BZ has already released, and in turn opens the magnet circuit at armature br4 whereupon the wipers of the 10/- counting switch TSS are moved on to the next set of bank contacts. In this position, earth by way of the bank commoning and wiper 1d of the switch TSS is connected over armature s10 and wiper 3d and bank contact to operate the relay FV. This relay thereupon at armatures fv1—fv4 so changes the connections from the upper banks of the switch TWS that on the succeeding set of five contacts the wipers 3c and 4c will complete circuits to operate the necessary combination of relays in the indicator to produce the numbers 5 to 9 in place of 0 to 4. Similarly if a further five 2/- units are stored on the banks of the 2/- counting switch TWS in the manner already described, relay BZ will again be operated from earth over wiper 2c to advance the wipers of the 10/- counting switch TSS on to the next set of bank contacts. Upon the operation of relay BR upon this occasion, earth from armature br7 will be connected over wiper 2d and bank commoning, winding of relay CZ in series with relay CG to battery, whereupon both relays are operated in order to complete circuits for the advancement of the wipers of the £1 counting switch PCS on to the next set of bank contacts, to increase the total showing on the indicator by £1. Since the wipers of the 10/- counting switch TSS are now in the third position, wiper 3d will disengage from the bank commoning to release relay FV, and under these circumstances the connections to the banks associated with wipers 3c and 4c are restored to normal in order to produce the coding for the display of numerals 0 to 4.

Returning now to the stored units collecting switch SUC, it will be seen that when wiper 6b encounters the bank commoning, earth over conductor 51 will be extended by way of wiper 6b and bank commoning, armature tw2, winding of relay ON to battery so that relay ON will be operated during the automatic rotation of the switch. When the switch SUC has made one complete revolution, wiper 6b will again encounter bank contact 1, so that the circuit of relay ON will be opened and during its slow release period, earth will be extended from wiper 6b over armature on2 to effect the operation of relay TW which is also slow to release. Relay TW upon operating, at its armature tw2 prepares a locking circuit for itself, at armature tw3 connects up the wipers 3b and 7b to the impulsing circuit of the 2/- counting switch in place of wipers 4b and 8b, at armature tw4 opens a further point in the circuit of relay MS and at armature tw1 opens the locking circuit of relay BB and extends earth from conductor 51 to the common holding conductor 53 to maintain the various storing relays in an operated position. During the slow release period of relay BB the circuit previously traced by way of bank contact 1 and wiper 5b is completed to the driving magnet SUM which is thereby enabled to make its first step, and thereafter its subsequent rotation is controlled by earth picked up over wipers 5b and 1b successively. Accordingly, the stored units collecting switch SUC is caused to make another complete revolution during which the outstanding registrations effecting markings in the second set of banks will be picked up by wipers 3b to 7b and extended to the 2/- counting switch TWS in the manner already described. At the conclusion of the second revolution of the stored units collecting switch SUC, wiper 5b will again encounter bank contact 1, and since relay BB is released at this time, the magnet SUM fails to energize again and the wipers remain in this position. Relay TW is now released owing to the opening of its circuit at wiper 6b whereupon all the equipment with the exception of the counting switches is restored to normal.

It will be appreciated that the clearing down of the totals registered by the various totalizers is effected by restoring the associated individual keys such as SB, Fig. 12. When this is done, relays S and SA de-energize and complete homing circuits for the various counting switches which return to normal by self-interruption. Since in this position, no circuits are completed for the indicator control relays such as A, B, C and D, Fig. 17, the indicating lamps are extinguished and the whole of the apparatus is ready for a new selling period.

As has already been suggested, certain of the equipment shown in Fig. 12 is not required for the system illustrated but has only been included to indicate the small changes required if the traffic is not heavy enough to warrant the use of storing relay groups. In these circumstances the connections from the wipers of the horse collecting switch HCS would be made over contacts of relay SR direct to the impulsing relays AM and BM. Moreover the stored units collecting switch would clearly not be required and conductor 128 would be connected to conductor 82 to control the horse collecting switch. If only the 10/- storing relay groups were dispensed with, the stored unit collecting switch would still be required and relays BM, BR and BZ would connect earth to conductor 82 as well as to conductor 128 at the proper time.

As a specific example, if all the 2/- decoding relay groups were accessible over wipers 1 and 5 of the switch HCS these wipers would be connected to conductor 113, Fig. 12, and conductors 113 and 114 would be connected by armature sr1. Similarly wiper 3 of switch HCS would be connected to conductor 115, Fig. 12, and conductors 116 and 117 would be connected by armature sr6.

Although owing to the capacity of the banks on the horse collecting switch HCS the wipers 1 and 5 could only accept markings from 50 machines, it will be appreciated that a switching device similar to that incorporated in the stored units collecting switch SUC, Fig. 10, could be provided to change over to the wipers 2 and 6 after the switch has made one complete revolution, thereby increasing the capacity to 100 machines with a comparatively small sacrifice in speed of operation.

In order to permit the ticket-issuing machines to be locked from a central control point to prevent the issue of further tickets, special control arrangements are provided which will now be considered. As may be seen from Fig. 2 each machine is provided with a solenoid LTS having a sliding plunger with a separate coil for operation in each direction. Operation in one direction permits the runner keys to be depressed, while operation in the other direction effects the locking of the keys against operation. Since each machine on the course is provided with a solenoid of this type, it will be appreciated that individual control would be somewhat laborious if the number of machines were considerable, and the arrangement about to be described provides a means whereby the operation of locking and unlocking the machines is effected automatically by the operation of a two-position common control key in a certain direction, and an indication is given when all the machines have responded correctly. The operation of the control key ULK shown in Fig. 1 to the right completes a circuit from earth by way of the operated springs of the key, wiper 116 of the machine control switch MCS, conductor 117, left-hand coil of the solenoid LTS, Fig. 2, and parallel thereto, by way of the resting springs 144 at the left-hand side, over conductor 118 and bank contact and wiper 119, of the machine control switch MCS, winding of relay LK to battery. Relay LK on operating, at its armature lk1 extends earth by way of the operated contacts of the key to the driving magnet MCM and battery feed relay BF to battery, whereupon magnet MCM energizes in order to prepare for the advancement of the wipers on to the next set of bank contacts and as relay BF is operated in series therewith, at armature bf1 the circuit of the all-machines-locked signal lamp AML is held open. When the plunger of the solenoid LTS is drawn over to its left-hand position, to lock the runner keys against operation, and springs 144 are operated, so that relay LK releases and in turn opens the circuit of the driving magnet MCM so that the wipers are advanced on to the next set of bank contacts into engagement with the conductors extending to a similar solenoid in another machine. In this manner the wipers of the control switch MCS are advanced step by step over the bank contacts, and in each position the solenoid of the particular machine connected with is operated. Since this stepping motion takes place very rapidly, the slow release battery feed relay BF holds up continuously during the stepping period and maintains open the circuit of the associated signal lamp AML.
When all machines have been connected with over the wipers of the switch MCS and all the latching solenoids have been operated to the required position, relay LK will no longer be energized and the circuit of the driving magnet MCM and the battery feed relay BF is opened for an appreciable period, so that relay BF releases. Thereupon at armature bf1 earth is extended by way of the operated springs of the key to light the all-machines-locked signal lamp AML thereby indicating to the officer at the control position that all the machines have been locked. If for some reason a solenoid fails to operate when its circuit is completed over the wipers of the switch MCS, relay LK will be held in an operated position and the signal lamp AML will fail to light after the usual period of time has elapsed. Under these conditions, therefore, the officer at the control position would be informed that the locking operation had failed at some point and the position of the wipers of the machine control switch MCS would give an indication of the particular machine which had failed to respond, and the necessary steps could then be taken to remedy the faulty condition.

When the issue of tickets is to recommence, it will be necessary to reverse the operations to cause all the machines to be unlocked and for this purpose the common control key will be operated to the left. Thereupon the relay UK is connected up over the wipers 120 and 121 in parallel with the right-hand coil of the solenoids and a similar cycle of operations to that already described takes place except that in this case the circuit of the driving magnet MCM will be completed by way of the armature uk1. When all the machines have responded correctly, relay UK will not re-energize and upon the release of relay BF, earth will be extended by way of its resting armature bf1 and operated springs of the common control key to light the all-machines-unlocked signal lamp AMU. In this case also if one of the machines should fail to respond correctly, relay UK would be maintained operated and the signal lamp AMU would not light whereupon the necessary steps would be taken to locate the trouble.

Although the machine control switch MCS shown in Fig. 1 has a capacity of 25 points only, it will be readily appreciated by those skilled in the art that other switches similar to MCS could be brought into operation in turn to effect the control of a considerably larger group of ticket-issuing machines.

Although the use of a rotary switch for control of the locking and unlocking operation is considered preferable, it is not essential. As an alternative the springs operated by the solenoids could all be connected in parallel and a relay operated in a circuit including these parallel branches so that it would only release and connect up the required supervisory signal when all the branches had been opened in response to the operation of all the latching solenoids to the required position. As a modification the springs on the solenoids could be arranged to make on operation rather than break, and would then be connected in series in the circuit of a relay which would only operate to light the appropriate signal lamp when all solenoids had moved into the correct position.

A description will now be given of the various alarms which have been provided to supervise the correct functioning of the apparatus and give an indication of any faulty operation.

During the normal operation of the horse collecting switch HCS, Figs. 6 and 8, which is controlled by the interrupter relay SR, the circuit of the slow-to-operate relay RA is almost continually held open, on the one hand by the operated armature of the relay CA which operates in series with relay SR, and on the other hand by the operated armature of relay MA, which is operated from the locking earth which is extended to the driving magnet HCM from time to time as the markings are encountered by the wipers of the switch HCS. If now the magnet HCM fails to energize, or alternatively is held locked in an operated position, one or other of the relays CA or MA will be released for an appreciable period, and earth over conductor 54 will cause the slow-to-operate relay RA to be energized. Thereupon, at armature ra1 it completes the circuit of the individual collecting switch alarm lamp CAL, and at its armatures ra2 and ra3 extends earth over the conductors 142 and 143 to complete the circuit to suitable main alarms which have not been shown.

Considering now the alarm equipment associated with the decoding relay group shown in Fig. 3, it will be understood that under the normal circuit conditions relay SWR on operating prepares a circuit for relay SP at its armature *swr*1. In case for some reason the registration is not collected after a reasonable period of time, relay SWR will still be operated and the connection of earth pulses to conductor 135 which takes place at intervals will cause the operation of relay SP over its upper winding. Relay SP thereupon operates and at its armature *sp*2 completes a circuit for its lower locking winding in series with the lower winding of relay ZP to battery, which latter relay does not operate in this circuit. If now the conditions persist for a predetermined period of time, an earth pulse will be extended over conductor 135 by way of armature *sp*1 to the upper winding of relay ZP which thereupon operates. At armature *zp*1 it cuts off the earth pulse lead extending to relay SP, at armature *zp*3 completes a locking circuit over its lower winding in parallel with relay SWR and at the same time short circuits the lower winding of relay SP so that this relay then releases, at armature *zp*4 extends earth to the individual decoding group alarm lamp DAL, and at armature *zp*2 connects earth over the conductor 134 to bring into operation a common alarm signal which has not been shown.

Considering now the alarm equipment associated with the £1 translating switch TP, Fig. 11, it will be remembered that under the normal conditions of working when a marking is connected to the bank contacts of this switch, earth is supplied from conductor 78 at substantially the same instant to cause the rotation of the wipers in the manner which has been described. The earth on conductor 78 is extended over armatures *bp*1 and *br*1, winding of slow-to-operate relay BS to battery, and in parallel thereto through the winding of relay BQ and the resistance YZ to battery. Relay BQ upon operating in this circuit, at armature *bq*1 closes a point in the circuit for relay BR which will become effective upon the operation of the battery feed relay BP, which operates in synchronism with the driving magnet TPM. Upon the operation of relay BP relay BR is operated and locked in an alternative circuit independent of armature *bq*2 and moreover at armature *br*2, relay BQ is short-circuited thereby rendering that relay slow to release. During the normal circuit operation therefore when relay BP is intermittently energized, both relays BR and BQ will be maintained in an operated condition and the circuit of the slow-to-operate relay BS will be opened on the one hand at armature *br*1, and on the other hand at armature *bq*1. If, however, for any reason earth is connected to conductor 78 and the translated £1 switch TP fails to operate, relay BQ will be operated as explained but owing to the non-operation of relays BP and BR for an extended period, sufficient time will be allowed for the slow-to-operate relay BS to energize, thereby at its armature *bs*1 completing the circuit of the individual translated £1 switch alarm lamp TPA, and at armatures *bs*2 and *bs*3 connecting earth over conductors which extend over conductors 140 and 141 to a common alarm circuit which may be the same as those previously referred to. Similarly in case the condition should arise where the magnet TPM becomes energized but fails to open its interrupter contacts, relay BP will be held in an operated position, thereby holding operated relay BR which at armature *br*2 maintains a short-circuit across the winding of relay BQ sufficiently long to cause it to release so that the alarm relay BS is then operated in a circuit including the resting armature *bq*1 to connect up the alarms previously referred to.

In order to check the operation of a ticket-issuing machine as to its ticket printing and issuing functions, each machine is provided with a "test" key such as that shown in Fig. 2. The operation of this key in place of one of the runner keys closes the obvious circuit for the latching magnet LAM, Fig. 2, from earth through contacts Z, which are closed by complete operation of the test key as by the complete operation of any one of the runner keys. Magnet LAM thereupon operates to close the knife switch KNS, whereupon the circuit of motor MOR is completed. Motor MOR thereupon operates the machine to issue a ticket which does not bear any runner number. Inasmuch as the test key is not arranged to transmit an impulse to a decoding relay group, no indicator will be picked up by a collecting switch and, consequently, no registration in a totalizer will be made.

I claim:

1. In a totalizing system, a plurality of transmitting stations, each having means for transmitting signals of a value individual thereto, the various values being denominationally related, a register having means for registering signals of different values, an indicator for indicating the sum total of the registered values, signal-collecting means, means for operating said collecting means to collect the signals of all values transmitted from said stations, means operated by said collecting means for storing collected signals of the lowest value, means controlled by said storing means when the number of signals stored therein are equal to a single signal of the next higher value to transmit a signal of said next higher value to said register, means for transmitting directly to said register all collected signals having values higher than said lowest value, and manually controlled means for transmitting the stored lowest value signals to said register, whereby fractions of said next higher value are registered and indicated only when desired.

2. In a totalizing system, a plurality of transmitting stations, each having means for transmitting signals of a value individual thereto, all values being denominationally related, a register for registering all values of signals, an indicator indicating the sum total of the registered values, signal-collecting means, means for operating said collecting means to collect signals of all values transmitted from said stations, a storage relay group containing relays equal in number to the number of signals of lowest value required to make one signal of the next higher value, means operated each time a signal of the lowest value is collected to operate one of said relays, means operated by the last storage relay operated to transmit a signal of said next higher value to said register, means for transmitting direct to said register all collected signals having values higher than said lowest values, and manually controlled means for transmitting to said register the stored signals of said lowest value when the number thereof is less than said equal number, whereby fractions of said next higher value are registered and indicated only when desired.

3. A totalizer for use in a totalizing system in which indications of two denominational values corresponding to the issues of tickets of a certain kind are transmitted from a plurality of ticket-issuing machines to a totalizer individual to that kind of ticket, said totalizer comprising a register switch for each value of the ticket, a group of storing relays for storing a number of indications of the lower value equivalent to one indication of the higher value, means for simultaneously collecting indications of both values, means associated therewith and operating each time an indication of the lower value is collected for operating one of said storing relays and operating each time an indication of the higher value is collected to operate the corresponding register switch to register that indication, means operated by the operation of the last of said storing relays to operate the higher value register switch to register as a single indication said number of lower value indications stored in said relay group, and manually controlled means for effecting the operation of the lower value register switch to transfer thereto a number of lower value indications stored in said relay group and less in number than said equivalent number.

4. A totalizer for use in a totalizing system in which indications of two denominational values corresponding to issues of tickets of a certain kind are transmitted from a plurality of ticket-issuing machines to a totalizer individual to said certain kind of ticket, said totalizer comprising a register switch for each value ticket, a group of storing relays for storing a number of indications of the lower value equivalent to a single indication of the higher value, a constantly rotating switch having a wiper for each value for simultaneously collecting indications of both values, means associated with each wiper and operating each time an indication is collected, each operation of the means associated with the lower value wiper operating one of said storing relays to store the lower value indications and each operation of the means associated with the higher value wiper operating the corresponding register switch to register the higher value indications, means operated by the operation of the last relay of said group to operate the higher value register switch to register therein a single indication equivalent to said number of lower value indications, and means operable to effect the operation of the lower value register switch to register therein a number of stored lower value indications less in number than said equivalent number.

5. A totalizer for use in a totalizing system in which indications corresponding to the issue of tickets of a certain kind are transmitted from a plurality of ticket-issuing machines capable of issuing units-value tickets and from a plurality of ticket-issuing machines capable of issuing tickets of a higher denominational value simultaneously to a totalizer individual to said certain kind of tickets for the purpose of totalizing the value of all tickets of said certain kind issued, said totalizer comprising a units-value register switch, a denominational-value registering switch, a continuously rotating collecting switch having a plurality of wipers arranged to collect simultaneously units-value indications and a single wiper to collect the denominational-value indications, a group of storage relays allotted to each units-value wiper and adapted to store a number of units-value indications equivalent to one denominational-value indication, means associated with each units-value wiper and operated each time the associated wiper collects a units-value indication to operate one relay of the allotted storing group to store the indication therein, means associated with each relay group and operated by the operation of the last relay thereof for operating said denominational-value register switch to register therein one indication equivalent to said stored number of units-value indications, and an auxiliary collecting switch operable to collect the units-value indications stored in each relay group and to operate said units-value register switch to register therein the units-value indications thus collected.

6. In a totalizing system, a plurality of ticket issuing machines, a register, a switch for the register having bank contacts, storage devices for storing indications representing operations of the ticket machines, a conductor common to said devices, a relay for each device, said conductor normally connected to bank contacts of said switch through contacts of said relays, means controlled by each relay for applying potential to said conductor and through the contacts of the other relays to the corresponding bank contacts, and other contacts on each relay closed by the energization of such relay to disconnect the conductor from the contact corresponding thereto.

7. In a totalizing system, a plurality of ticket issuing machines, storage devices for storing indications from said machines, a relay for each device, a register, a switch for said register, contacts for each device in said switch, a conductor common to said devices, said conductors normally connected to certain of said switch contacts through a contact of each relay, and means controlled by the energization of the relay of one device for disconnecting the conductor from the associated switch contact and connecting it to another switch contact to operate the switch and register.

8. A totalizer for use in a totalizing system in which indications corresponding to issues of tickets of a certain kind having two denominational values are transmitted from a plurality of ticket-issuing machines to a totalizer individual to said certain kind of ticket, said totalizer comprising a counting switch for each value ticket, a group of storing relays for storing a number of indications of the lower value equivalent to a single indication of the higher value, a constantly rotating switch having a wiper for each value for simultaneously collecting indications of both values, means associated with each wiper and operating each time an indication is collected, each operation of the means associated with the lower value wiper operating one of said storing relays to store the lower value indication and each operation of the means associated with the higher value indications, means operated by the operation of the last relay of said group to momentarily arrest the rotation of said collecting switch and to operate the higher value counting switch to register therein one indication equivalent to said number of stored lower value indications, and means operable at will to operate the lower value counting switch to register therein the stored lower value indications when the number thereof is less than said equivalent number.

LANCELOT MARTIN SIMPSON.